United States Patent
Malley et al.

(10) Patent No.: US 11,928,471 B2
(45) Date of Patent: Mar. 12, 2024

(54) METADATA PREDICTOR

(71) Applicant: International Business Machines Corporation, Armonk, NY (US)

(72) Inventors: Edward Thomas Malley, Eastchester, NY (US); Adam Benjamin Collura, Hopewell Junction, NY (US); Brian Robert Prasky, Campbell Hall, NY (US); James Bonanno, Liberty Hill, TX (US); Dominic Ditomaso, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 17/406,513

(22) Filed: Aug. 19, 2021

(65) Prior Publication Data
US 2023/0057600 A1    Feb. 23, 2023

(51) Int. Cl.
*G06F 9/355* (2018.01)
*G06F 9/30* (2018.01)
*G06F 9/38* (2018.01)

(52) U.S. Cl.
CPC .......... *G06F 9/355* (2013.01); *G06F 9/30079* (2013.01); *G06F 9/3806* (2013.01); *G06F 9/3814* (2013.01)

(58) Field of Classification Search
CPC .... G06F 9/355; G06F 9/30079; G06F 9/3806; G06F 9/3814
See application file for complete search history.

(56) References Cited

U.S. PATENT DOCUMENTS

| | | |
|---|---|---|
| 9,141,527 B2 | 9/2015 | Atkisson et al. |
| 9,507,598 B1 | 11/2016 | Bonanno et al. |
| 9,588,891 B2 | 3/2017 | Atkisson et al. |
| 9,934,040 B2 | 4/2018 | Bonanno et al. |
| 10,394,559 B2 | 8/2019 | Bonanno et al. |
| 10,423,420 B2 | 9/2019 | Bonanno et al. |
| 10,430,195 B2 | 10/2019 | Bonanno et al. |
| 10,481,912 B2 | 11/2019 | Bonanno et al. |

(Continued)

FOREIGN PATENT DOCUMENTS

| | | | |
|---|---|---|---|
| EP | 1810130 A1 * | 7/2007 | ........... G06F 9/3848 |
| EP | 1810130 A1 | 7/2007 | |
| WO | 2006057685 A1 | 6/2006 | |

OTHER PUBLICATIONS

Adiga; "The IBM z15 High Frequency Mainframe Branch Predictor"; 2020 ACM/IEEE 47th Annual International Symposium on Computer Architecture (ISCA); Jul. 13, 2020, 13 pages.

(Continued)

*Primary Examiner* — Prasith Thammavong
(74) *Attorney, Agent, or Firm* — CANTOR COLBURN LLP; Jeffrey Ingalls

(57) ABSTRACT

Embodiments for a metadata predictor. An index pipeline generates indices in an index buffer in which the indices are used for reading out a memory device. A prediction cache is populated with metadata of instructions read from the memory device. A prediction pipeline generates a prediction using the metadata of the instructions from the prediction cache, the populating of the prediction cache with the metadata of the instructions being performed asynchronously to the operating of the prediction pipeline.

20 Claims, 31 Drawing Sheets

(56) References Cited

U.S. PATENT DOCUMENTS

| | | | |
|---|---|---|---|
| 11,556,474 B1* | 1/2023 | Bonanno | G06F 12/0897 |
| 2006/0095721 A1* | 5/2006 | Biles | G06F 9/3858 |
| | | | 712/34 |
| 2018/0293076 A1 | 10/2018 | Sadasivam et al. | |
| 2020/0004543 A1* | 1/2020 | Kumar | G06F 9/3844 |

OTHER PUBLICATIONS

Anonymously. "Exploiting Agnostic Branches"; ip.com IPCOM000244897D; Jan. 27, 2016; 3 pages.

Anonymously. "Method for pipelining line predictors"; ip.com IPCOM000018664D; Jul. 30, 2003; 7 pages.

Anonymously; "Address Mode Aware Branch Prediction With Shutdown Capability"; ip.com IPCOM000235852D; Mar. 27, 2014; 6p.

Anonymously; "System and Method for Recovering Global Branch Prediction Information Using Address Offset Information"; ip.com IPCOM000216961D; Apr. 25, 2012; 5 pages.

Busaba. "IBM zEnterprise 196 microprocessor and cache subsystem"; IBM J. Res. & Dev. Vol. 56 No. 1/2 PAPER 1 Jan./Mar. 2012; 12 pages.

Google Cloud, [online]; [retrieved on Jul. 9, 2021]; "Containers At Google" 10 pages https://cloud.google.com/containers.

Jacobi. "The IBM z14 microprocessor chip set"; 2017 IBM Corporation; 20 pages.

Lardinois, "WTF is a container?"; Extra Crunch; Oct. 16, 2016; 11 pages.

McCarty. "Container Tidbits: When Should I Break My Application into Multiple Containers?"; Red Hat Blog; Mar. 16, 2016; 9 pages.

Reselman. "Once and forv A;;: Containers Are Not VMs"; https://blog.gurock.com/containers-are-not-vms/ Match 12, 2020; 5p.

Sam, "What are Containers? Simplified for Beginners"; Peer2Peercloud.com Knowledge Sharing Platform for Public Cloud Professionals; Mar. 31, 2019; 5pages.

Wolfe. "Programming Heterogeneous Parallel Architectures"; The Portland Group, Inc. 2013; 79 pages.

International Search Report; International Application No. PCT EP2022/072767; International Filing Date: Aug. 15, 2022; dated Dec. 2, 2022; 13 pages.

* cited by examiner

METADATA PREDICTOR

BACKGROUND

The present invention generally relates to computer systems, and more specifically, to computer-implemented methods, computer systems, and computer program products configured and arranged for a metadata predictor.

A pipeline microprocessor has a path, channel, or pipeline that is divided into stages that perform specific tasks. Each of the specific tasks is part of an overall operation that is directed by a programmed instruction. Each of the programmed instructions or macro instructions in a software application program is executed in sequence by the microprocessor. As a programmed instruction enters the first stage of the pipeline, certain tasks are accomplished. The instruction is then passed to subsequent stages for accomplishment of subsequent tasks. Following completion of a final task, the instruction completes execution and exits the pipeline. Execution of programmed instructions by a pipeline microprocessor is analogous to the manufacture of items on an assembly line. One of the obvious aspects of any assembly line is that there are multiple items resident in the line in successive stages of assembly during any given point in time. The same is true for a pipeline microprocessor. During any cycle of a pipeline clock signal, there are multiple instructions present in the various stages, with each of the instructions being at successive levels of completion. Therefore, microprocessors allow overlapping execution of multiple instructions with the same circuitry. The circuitry is usually divided up into stages and each stage processes a specific part of one instruction at a time, passing the partial results to the next stage.

SUMMARY

Embodiments of the present invention are directed to computer-implemented methods for a metadata predictor. A non-limiting example computer-implemented method includes operating an index pipeline to generate indices in an index buffer in which the indices are used for reading out a memory device and populating a prediction cache with metadata of instructions read from the memory device. The computer-implemented method includes operating a prediction pipeline to generate a prediction using the metadata of the instructions from the prediction cache, the populating of the prediction cache with the metadata of the instructions being performed asynchronously to the operating of the prediction pipeline.

A non-limiting example computer-implemented method includes using a reset address to query an index accelerator and determining that an index line is present in the index accelerator responsive to the query. The computer-implemented method includes determining a sequential line to the index line in the index accelerator and providing an index buffer with the sequential line.

A non-limiting example computer-implemented method includes using metadata to generate a primary prediction and an auxiliary prediction, determining that the primary prediction and the auxiliary prediction are different, and selecting the auxiliary prediction, responsive to the primary prediction and the auxiliary prediction being different. The computer-implemented method includes extending a length of a prediction pipeline for a predetermined time and providing the auxiliary prediction to an instruction execution pipeline.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
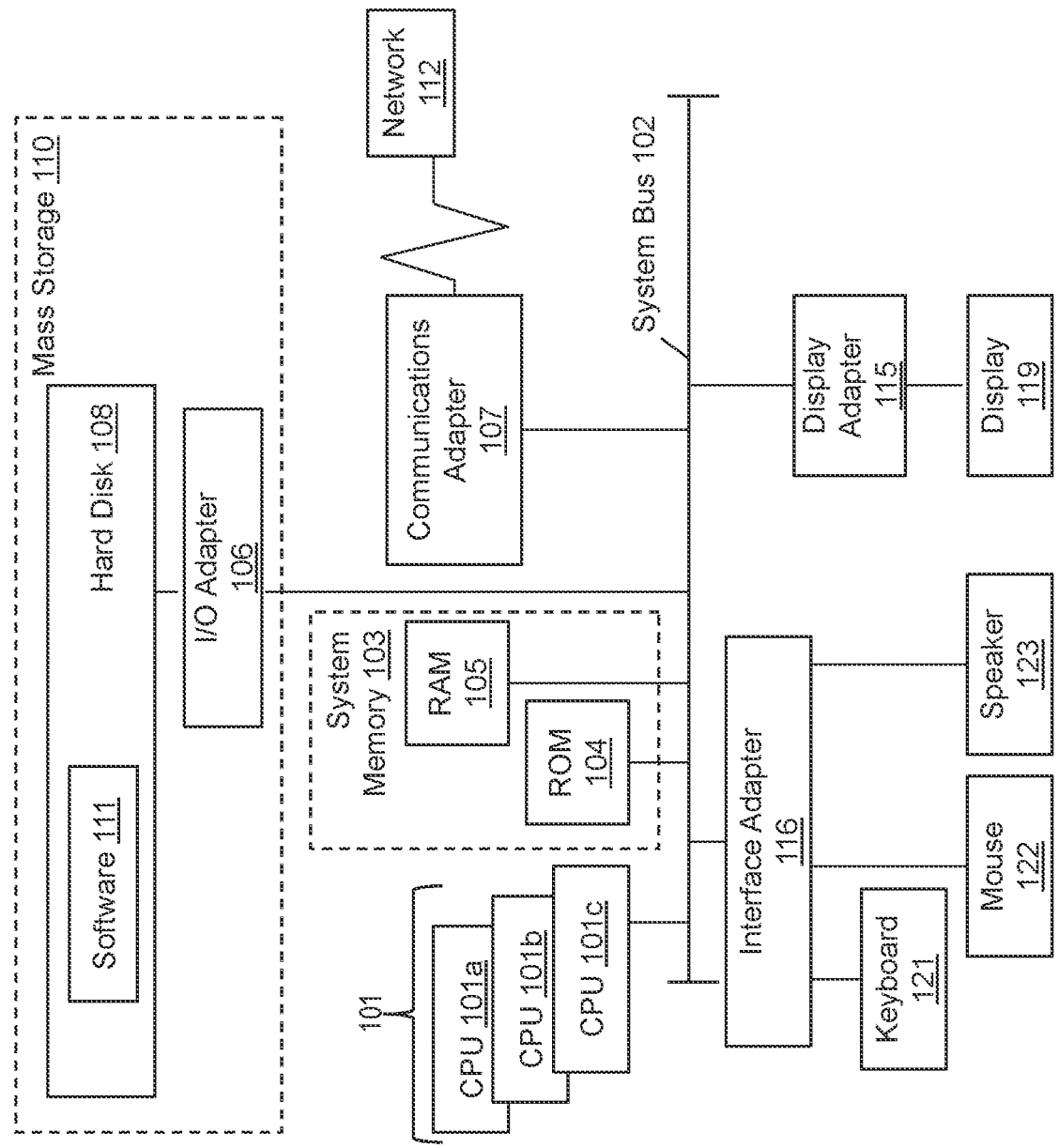
FIG. 1 depicts a block diagram of an example computer system for use in conjunction with one or more embodiments of the present invention.

One or more embodiments of the present invention provide computer-implemented methods, computer systems, and computer program products arranged and configured for providing a metadata predictor with a metadata predictor cache. One or more embodiments provide improved processor performance by performing caching and reuse of prediction metadata in order to ensure low latency branch predictions, thereby minimizing fetching inaccuracies and branch penalties downstream. Further, one or more embodiments are configured and arranged to provide a metadata predictor line index accelerator with prediction cache. The accelerator is configured to populate a line index buffer (LIB), allowing a metadata buffer (e.g., a branch target buffer (BTB) or other buffer) to be accessed ahead of the prediction pipeline, thereby minimizing prediction latency. Further, one or more embodiments are configured and arranged to provide a variable length metadata prediction pipeline in the metadata predictor.

A metadata predictor is a system that uses metadata to predict information about instructions and/or data in a microprocessor. Load instructions being dependent on store instructions is an example of a type of information that can be predicted in a metadata predictor. A line prefetch predictor is another example. Branch prediction is yet another type of metadata prediction that is a performance-critical component of a pipelined high frequency microprocessor. Branch prediction is used to predict the direction (e.g., taken versus not taken) and the target address of branch instructions. This is beneficial because it allows processing to continue along a branch's predicted path rather than having to wait for the outcome of the branch to be determined. A penalty is incurred only if a branch is mis-predicted.

A branch target buffer (BTB) is a structure that stores metadata including branch and target address information. The BTB can be searched in parallel to and independently from instruction fetching to find upcoming branches, in which case BTB is utilized for lookahead branch prediction, which is called asynchronous branch prediction. Additionally, the BTB can be accessed simultaneously with and/or after fetching instructions and used to determine instruction boundaries in order to provide a prediction for each encountered branch instruction, in which case it is called synchronous branch prediction. In either case, the performance benefit of the BTB is a function of the accuracy of the prediction provided from the BTB and the latency required to access the BTB.

A metadata prediction cache can capture metadata predictor output and reuse metadata predictor output while staying in the same section of code to repeatedly make predictions. Metadata predictors can be organized to have a variable line size with a parent-based design. A multi-level hierarchy of metadata predictors is possible. This is analogous to a multilevel instruction or data cache hierarchy. The first level of a two-level hierarchy would be smaller and faster to access than the second level which would be larger and slower. The design of a metadata predictor hierarchy is more flexible than that of an instruction or data cache hierarchy. This is because metadata is not required to be present and accurate for proper function of the processor unlike other caches.

Various terms may be utilized herein:

LIB is the line index buffer. LOB is the line output buffer. BTB is the branch target buffer. IL is the intraline branch which is a branch whose target is in the same line of instruction text (itext). DGT refers to dynamically guessed taken branch. Exit branch refers to a branch that takes the flow from line X to some other line. Entry point is the instruction address (IA) where the metadata predictor starts searching after finding an exit branch, thereby effectively being the exit branch's target instruction address. Taken branch offset is the number of lines between the entry point and the exit branch. SKOOT denotes the Skip Over Offset, which indicates a number of lines that contain no branches, and thus need not be searched.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
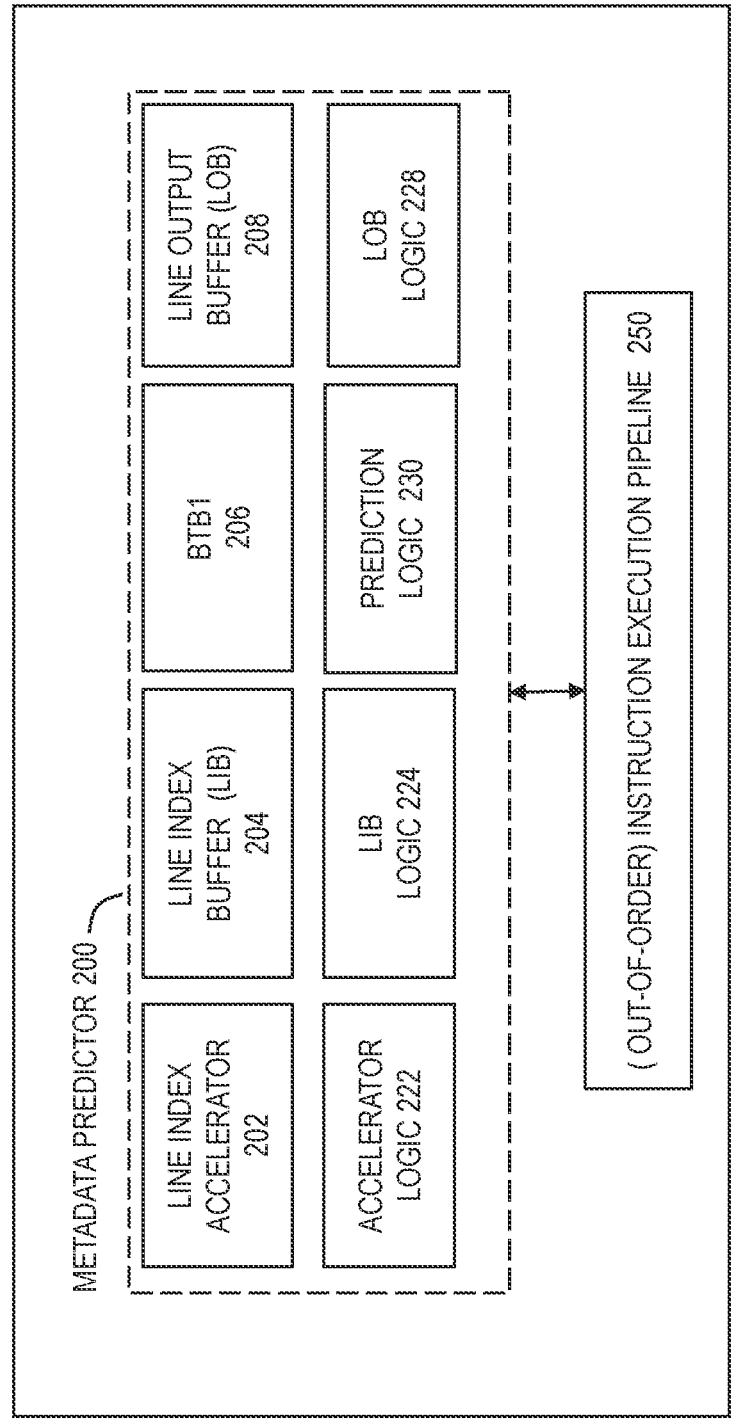
FIG. 2 depicts a block diagram of a metadata predictor in a processor in accordance with one or more embodiments of the present invention.

FIG. 2 is a block diagram of a metadata predictor 200 in processor 101 according to one or more embodiments of the inventions. Processor 101 could be representative of any of the processors 101 discussed in computer system 100 in FIG. 1. Metadata predictor 200 is outside of and runs asynchronously to an instruction execution pipeline 250. Instruction execution pipeline 250 can be an out-of-order pipeline and includes modules/blocks to operate as part of the processor core as understood by one of ordinary skill in the art. Metadata predictor 200 is configured to communicate with (e.g., send and receive data) from instruction execution pipeline 250. Instruction execution pipeline 250 can be any instruction pipeline. In an example instruction execution pipeline 250, of the several units that comprise the processor core, branch prediction logic has the responsibility of the instruction fetch and branch prediction in an instruction fetch and branch prediction unit (IFB). The IFB is the core's navigator, arbitrating all pipeline restart points for both threads. Furthermore, the IFB guides the instruction cache and merge (ICM) unit, is responsible for fetching instruction text from the level 1 instruction cache, and is responsible for attempting to ensure that only the instruction text on what it believes the correct speculative code path is delivered to the instruction decode and dispatch unit (IDU). The pipeline then dispatches to the instruction sequence unit (ISU) which maintains the out-of-order execution pipeline. Instruction issue queues are used to execute instructions in fixed-point units (FXU), vector and floating point units (VFU), load-store units (LSU), etc. Address translation is performed by the translator unit (XU), and checkpointing is managed by the recovery unit (RU). Once an instruction is decoded to be a branch, the dynamically predicted information of that branch overrides any instruction text based static guess that the IDU would normally apply.

Metadata predictor 200 includes various hardware components including line index accelerator 202, line index buffer (LIB) 204, branch target buffer (BTB1) 206, line output buffer (LOB) 208, accelerator logic 222, LIB logic 224, LOB logic 228, and prediction logic 230; the hardware components include caches, combinational logic, memory, etc. Although not shown for simplicity, metadata predictor 200 may include a BTB2 which is larger than BTB1 and can supply metadata to BTB1 in one or more embodiments. Further, the various hardware components of metadata predictor 200 include firmware (as computer-executable instructions) executed on microcontrollers, along with hardware modules, as special-purpose hardware (e.g., application specific hardware, application specific integrated circuits (ASICs), as embedded controllers, hardwired circuitry, etc.), and/or as some combination or combinations of these. In examples, the modules described herein can be a combination of hardware and programming. The programming can be processor executable instructions stored on a tangible memory, and the hardware can include processing circuitry for executing those instructions. Alternatively or additionally, the modules can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. Further, the modules of metadata predictor 200 can include various digital logic circuits to function as discussed herein.

Figure 3:
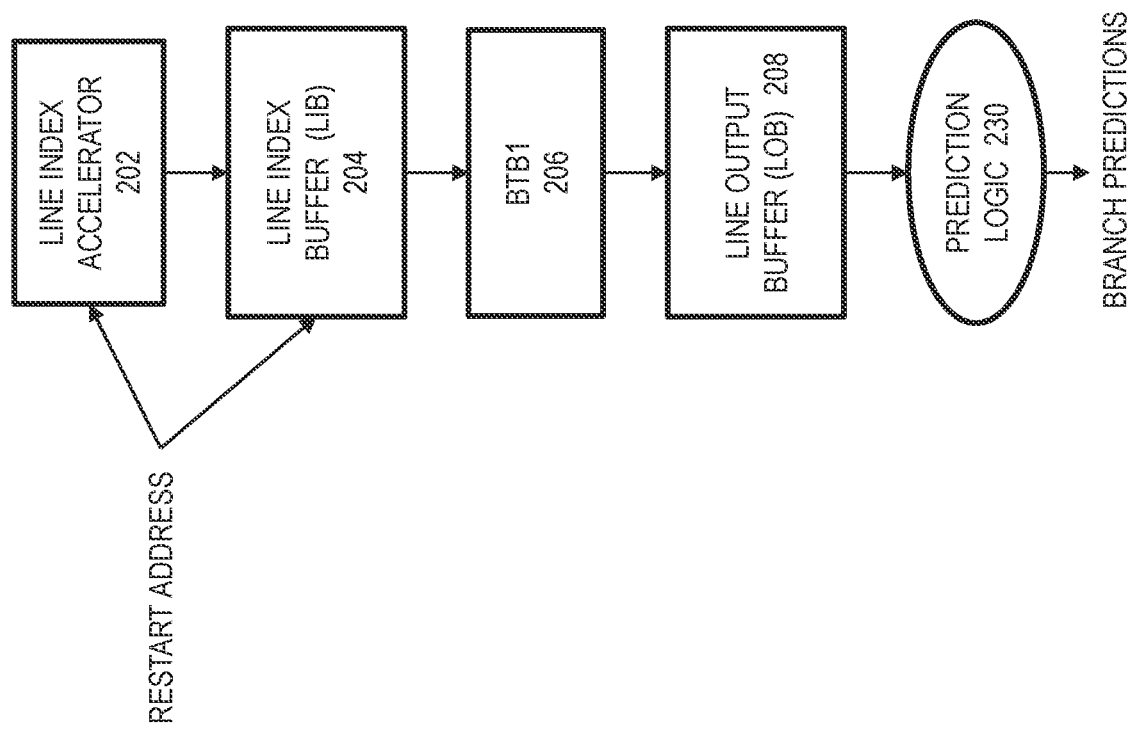
FIG. 3 depicts a block diagram a metadata predictor with a metadata prediction cache in accordance with one or more embodiments of the present invention.
Figure 4:
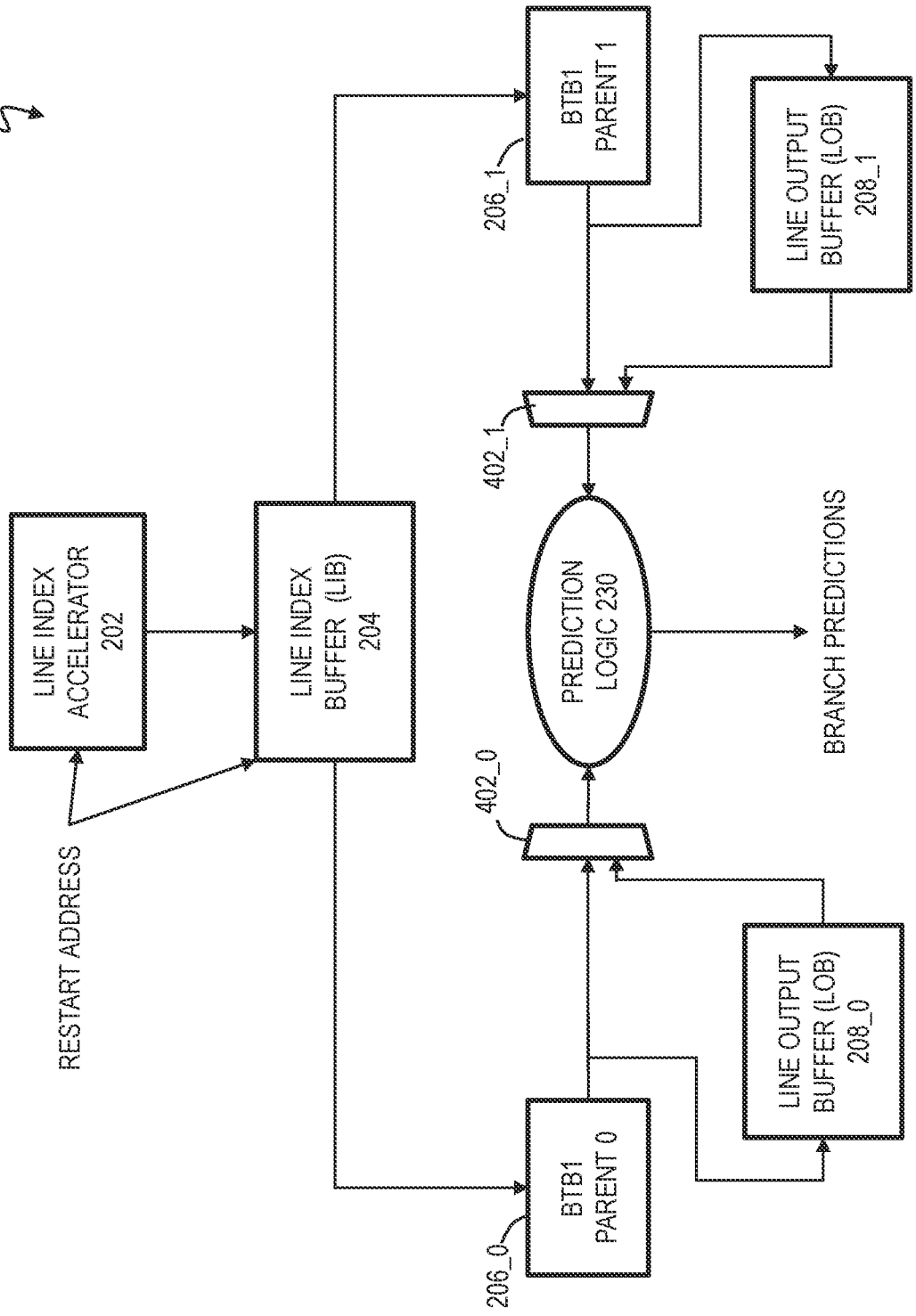
FIG. 4 depicts a block diagram of a metadata predictor with metadata prediction caches in a parent-based design in accordance with one or more embodiments of the present invention.

FIG. 3 is a block diagram of metadata predictor 200 with a prediction cache in accordance with one or more embodiments of the present invention. FIG. 4 is a block diagram of metadata predictor 200 with a prediction cache parent-based design in accordance with one or more embodiments of the present invention. BTB1 206 can be broken into quadrants for use, for example, four quadrants. More particularly, BTB1 206 is operated as multiple sections in the parent-based design of FIG. 4, although BTB1 206 is a memory structure. In FIG. 4, BTB1 206 is represented by two quadrants which depict BTB1 206 utilized as BTB1 206_0 and BTB1 206_1 for parent 0 and 1, respectively. Similarly, each quadrant has its own LOB 208 which is depicted as LOB 208_0 and LOB 208_1 in the parent-based design of FIG. 4. Multiplexers 402_0 and 402_1 may be utilized to provide the appropriate line of metadata to prediction logic 230 based on a predetermined manner of selection.

BTB1 206 is read out on a line basis, and output is written into a prediction cache, such as LOB 208 (including LOBs 208_0 and 208_1), to be reused while staying within that line. An index pipeline (e.g., index pipeline 552 depicted in FIG. 5) is configured for reading BTB1 206 and sending output into LOB 208. A prediction pipeline (e.g., prediction pipeline 554 depicted in FIG. 5) is configured for using BTB data from BTB1 206 (including BTB1 206_0 and BTB1 206_1) and LOB data from LOB 208 (including LOBs 208_0 and 208_1) to make predictions via prediction logic 230 of processor 101. In metadata predictor 200, index and prediction pipelines 552 and 554 are decoupled and operate independently of each other, in addition to operating asynchronously to instruction execution pipeline 250.

Branch prediction latency can be a source of performance issues for any processor; the downstream pipeline must accurately fetch instruction text as quickly as possible to maintain a low cycle per instruction (CPI). Accurate branch predictions allow for such fetching. However, if no prediction is available, the processor could: continue ahead and risk a branch wrong penalty for fetching the wrong instruction text or wait for a new branch prediction to become available, thus increasing CPI. According to one or more embodiments, buffering in LIB 204 and LOB 208 and reuse of prediction metadata in LOB 208 allow for low latency branch predictions, thereby keeping instruction fetching ahead of instruction execution, as well as providing power saving benefits. The decoupling of the index and prediction pipelines 552, 554 allows the index pipeline 552 to get ahead of the prediction pipeline 554, which can hide other prediction latency inducing events (e.g., read/write collisions, etc.). Further, the index pipeline 552 is to be read ahead of prediction pipeline 554 in order to allow the prediction pipeline 554 to generate predictions as quickly as possible.

Figure 5:
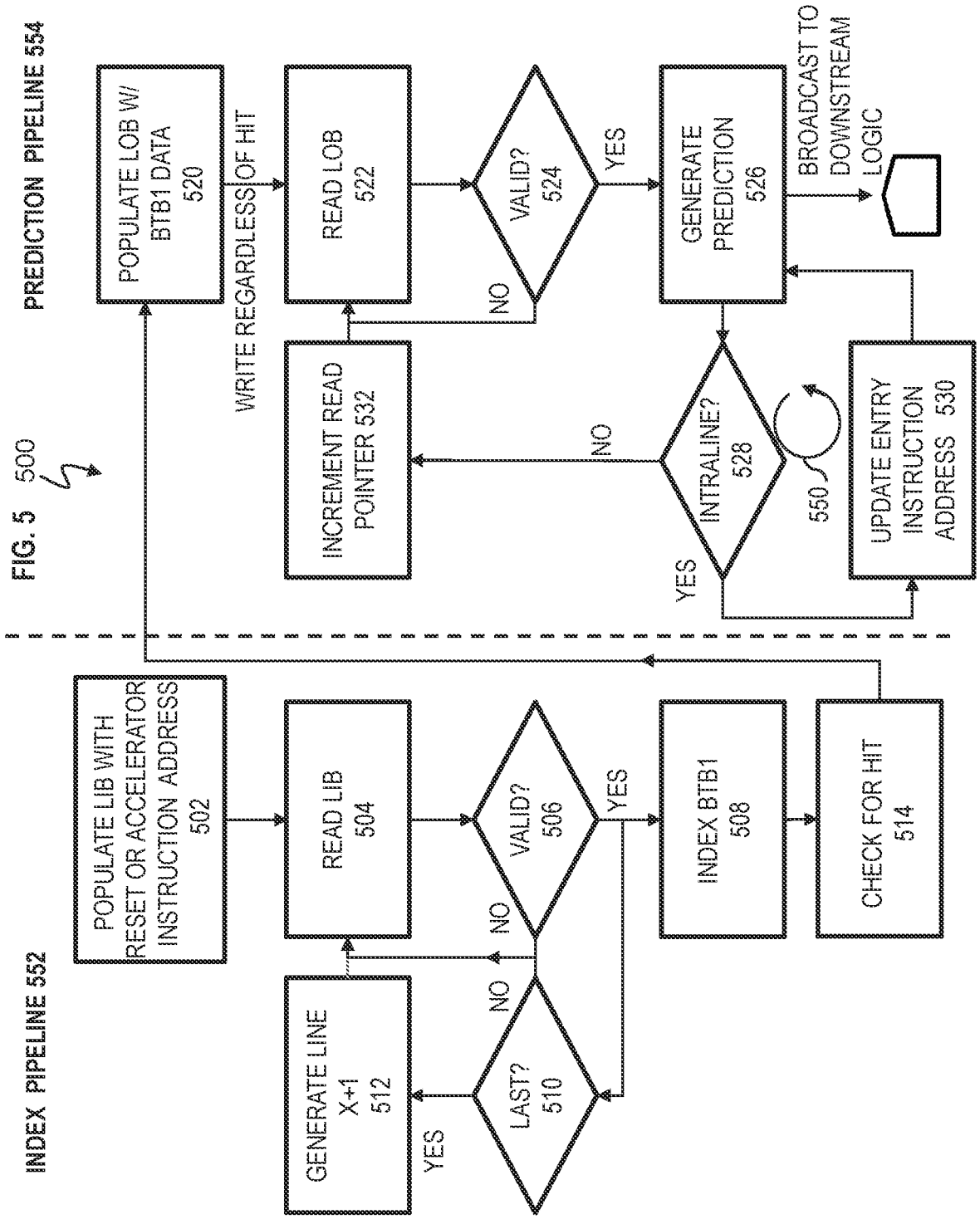
FIG. 5 depicts a block diagram of a metadata predictor process in accordance with one or more embodiments of the present invention.

To further illustrate details of index pipeline 552 and prediction pipeline 554, FIG. 5 depicts a metadata prediction cache process 500 for metadata predictor 200 in accordance with one or more embodiments. The metadata prediction cache process 500 is a computer-implemented process implemented by processor 101 in FIGS. 1, 2, 3, and 4, along with other figures discussed herein. The description of the metadata prediction cache process 500 shown in FIG. 5 is provided with reference, where appropriate, to FIGS. 1, 2, 3, and 4.

At block 502 of the index pipeline 552, metadata predictor 200 is configured to populate LIB 204. LIB 204 can be populated with a reset instruction address from instruction execution pipeline 250 and/or prediction logic 230. Additionally, LIB 204 can be populated by an accelerator instruction address. The accelerator instruction address can be sent to LIB 204 from line index accelerator 202. More regarding line index accelerator 202 is discussed further herein. LIB 204 may be a first in first out buffer (FIFO) or another type of buffer. The reset instruction is used to provide an index and/or index line in LIB 204, and the index line is stored and eventually utilized to search and/or query BTB1 206. The index and/or index line in LIB 204 refers to a subset of instruction address bits that are used by LIB 204 to access BTB1 206. In one or more embodiments, each entry in BTB1 206 may represent a 128 byte (B) line; based on the size of the BTB1, an index/index line in LIB 204 can use a subset of instruction address bits (e.g., a subset of the 128 B line), such as instruction address bits (48:56) which refer to instruction address bits 48-56 of the instruction address that is utilized to read BTB1 206. In one or more embodiments, the index/index line in LIB 204 can be any predefined subset of instruction address bit, and 128 B is illustrated for example purposes. Accordingly, an index line of LIB 204 is utilized to query BTB1 206. Further, an instruction execution pipeline event of the instruction execution pipeline 250, such as a branch wrong, can restart index pipeline 552, prediction pipeline 554, and line index accelerator 202.

At block 504, metadata predictor 200 (e.g., using LIB logic 224) is configured read out LIB 204, thereby causing indices with instruction addresses to be read out from LIB 204. LIB 204 may read out an index for an instruction address at a time.

At block 506, metadata predictor 200 (e.g., using LIB logic 224) is configured to check if the received instruction address is valid or not. Metadata predictor 200 (e.g., using LIB logic 224) is configured check if an actual instruction address is read out from LIB 204 or whether the output is empty. Each instruction address may be read out one at a time (e.g., serially) as an entry in a line (e.g., cache line), and/or as a group/block of entries. If ("NO") the instruction address is empty, flow returns to block 504 and metadata predictor 200 (e.g., using LIB logic 224) is configured to read LIB 204 which should have been populated with indices. If "YES" the instruction address is valid (i.e., present), flow proceeds to block 508. Also, if "YES" the instruction address is valid (i.e., present), metadata predictor 200 (e.g., using LIB logic 224) is configured to check if this is the last entry of LIB 204 at block 510. Block 510 checks whether this entry is the last index in the LIB. If this is not ("NO") the last entry in the LIB, metadata predictor 200 (e.g., using LIB logic 224) is configured to read out the next entry in the LIB by returning to block 504. If ("YES") this is the last entry in the LIB 204, metadata predictor 200 (e.g., using LIB logic 224) is configured to generate line X+1 by proceeding to the next consecutive line after the current line (e.g., line X), for populating the tail of the LIB 204 at block 512, and flow returns to block 504. Metadata predictor 200 writes line X+1 to the tail of the LIB, and once it has finished processing line X on the 'valid' path, metadata predictor 200 will process line X+1. For example, line X+1 refers to the next consecutive 128 B line of instruction text after line X. In one or more embodiments, it can be recognized that block 510 keeps prediction moving even if the accelerator no longer knows where to go, and thus, the LIB has run out of indices with which to access the BTB1. In such a case, index pipeline 552 is configured to generate the next sequential line and search BTB1 using it.

At block 508, metadata predictor 200 is configured to index BTB1 206 by sending a list of indices from LIB 204 to access and query BTB1 206. Each index of the indices is utilized for reading out BTB1 206. An index is a subset of address bits used to access an entry in the BTB1 (i.e., multiple addresses sharing the same index). A tag is used to verify that what was retrieved from the BTB1 matches the address being looked for. Although not shown, various queues can be utilized in index pipeline 552 and prediction pipeline 554 for holding data when applicable. As a branch target buffer, BTB1 206 contains and tracks branches that have been guessed taken (and/or resolved taken) and not taken, along with their target. BTB1 206 is a large array and/or cache that contains metadata about branch details. BTB1 206 holds instruction address bits as tags in preparation for search.

At block 514, metadata predictor 200 is configured to check for a hit in BTB1 206. The tags (for example) in the BTB1 are compared with the current search tag in the index. If they match, then the line of metadata read from the BTB1 will be used as an input to the prediction pipeline 554. If the tag in BTB1 does not match current search tag, then the line is not used for prediction. In one or more embodiments, whether or not there is a hit does not influence flow, and metadata predictor 200 can write the metadata to the LOB regardless of the hit. Accordingly, the flow from block 514 could be modified based on the implementation, and one implementation may choose to drop that metadata, since it cannot be used for prediction.

At block 520 of the prediction pipeline 554, metadata predictor 200 (e.g., using LOB logic 228) is configured to populate LOB 208 with data from BTB1 206. It is noted that LIB 204 and LOB 208 are smaller in size and capacity than BTB1 206. LOB 208 is populated with data from the cache hits of BTB1 206. Just as BTB1 206, LOB 208 stores branch and target address information, including locations, directions, and targets. It should be appreciated that, although BTB1 and LOB can be utilized for branch predictions, they can be utilized with any metadata for any purpose.

At block 522, metadata predictor 200 (e.g., using LOB logic 228) is configured to read out the line (e.g., cache line) in LOB 208. For example, an index/index line from LIB 204 is used to read the line of metadata from BTB1 206. In one or more embodiments, the output of LOB 208 is the line of branch prediction metadata associated with the 128B line of instruction text that has been search for by the index from LIB 204.

At block 524, metadata predictor 200 (e.g., using LOB logic 228) is configured to check if anything was read out (e.g., was a line of metadata for an instruction address read out) for the line of LOB 208. If data was not read out ("NO") for the cache line (i.e., empty), flow returns to block 522. If "YES" data (e.g., line of metadata for the instruction address) was read out, metadata predictor 200 (e.g., using LOB logic 228) is configured to generate the prediction and send the prediction (e.g., target address) downstream at block 526. For example, the predicted target address is sent to the instruction cache and merger (ICM) unit and the instruction decode and dispatch unit (IDU) of instruction execution pipeline 250 for processing. Additionally, at block 528, metadata predictor 200 (e.g., using LOB logic 228) is configured to check if the predicted target address in the line of metadata is intraline. When the predicted target address is intraline, this means that the predicted target address is in the same/current line of metadata for the instruction text that was read out of LOB 208. If "YES" the predicted target address is in the current line read out from LOB 208, at block 530, metadata predictor 200 (e.g., using LOB logic 228) is configured to update the entry instruction address and output the updated the entry instruction address (which is the next target address on the same line) to be used to generate another prediction without requiring another line be read from LOB 208; flow returns to block 530. Update the entry instruction address refers to which branches will be considered next for prediction. Continuing the example of using 128 B lines, assume the first search of this line was at byte 20 of that 128 B line. This means, if there are branches in bytes 0 to 19, metadata predictor 200 is not interested in those branches because processing has already branched beyond that instruction text. An intraline branch may take metadata predictor 200 right back to byte 20 (e.g., in the case of a small loop), but it could possibly take processing to a different byte. If the target of the intraline branch were to take processing to byte 10 instead of byte 20, then metadata predictor 200 would have to consider any branches in bytes 10 to 19, even though metadata predictor 200 did not on the last prediction. So, effectively, the search start position is being moved based on the intraline target. Blocks 526, 528, and 530 can continue executing loop 550 in the prediction pipeline 554 that generates new predictions using the current line with an updated instruction address (i.e., updated target address), thereby making metadata predictor 200 faster by not having to read out another/subsequent line (or entry).

If the predicted target address is not intraline ("NO"), metadata predictor 200 (e.g., using LOB logic 228) is configured to increment the read pointer at block 532, and flow returns to block 522. This causes LOB 208 to read out the next line. In one or more embodiments, the LOB, like the LIB, can be implemented to be FIFO, while other implementations are possible. So, if metadata predictor 200 determines that there is no intraline branch, this means it is done with this LOB entry and can increment to the next entry in the FIFO.

Figure 6:
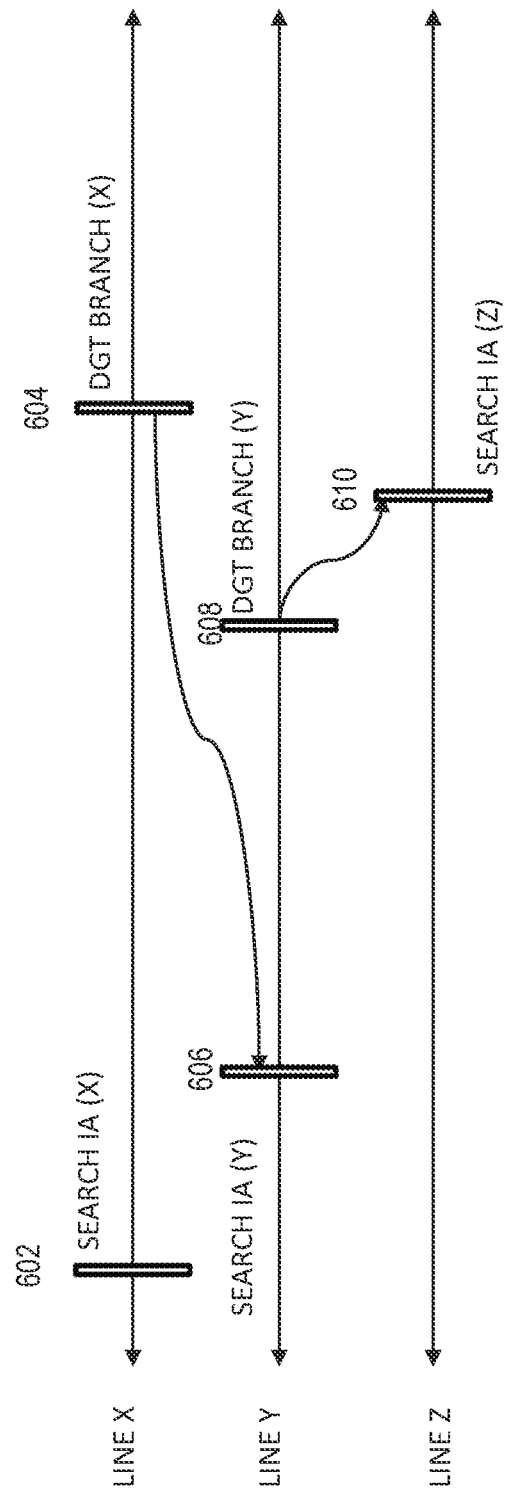
FIG. 6 depicts a block diagram a metadata predictor cache example in accordance with one or more embodiments in accordance with one or more embodiments of the present invention.

FIG. 6 is a block diagram of a metadata predictor cache example according to one or more embodiments. FIG. 6 illustrates three lines of code which are line X, line Y, and line Z, each of which contains a dynamically guessed taken (DGT) branch. Information on these branches has been collected in the BTB1 206. In other words, lines (of metadata for) X, Y, and Z are stored in LOB 208 (i.e., the prediction cache). Using an index from LIB 204, metadata predictor 200 (e.g., using LOB logic 228) searches the instruction address on line X of code of LOB 208 at event 602 and predicts (e.g., using prediction logic 230) the dynamically taken branch on line X of code at event 604, which branches to line Y of code in LOB 208. After branching to the target instruction address on line Y of code, metadata predictor 200 (e.g., using LOB logic 228) searches the instruction address on line Y of code at event 606 and predicts (e.g., using prediction logic 230) the dynamically taken branch on line Y of code at event 608, which branches to line Z of code in LOB 208. After branching to the target instruction address on line Z of code, metadata predictor 200 (e.g., using LOB logic 228) searches the instruction address on line Z of code of LOB 208 at event 610, and the process continues.

Figure 7:
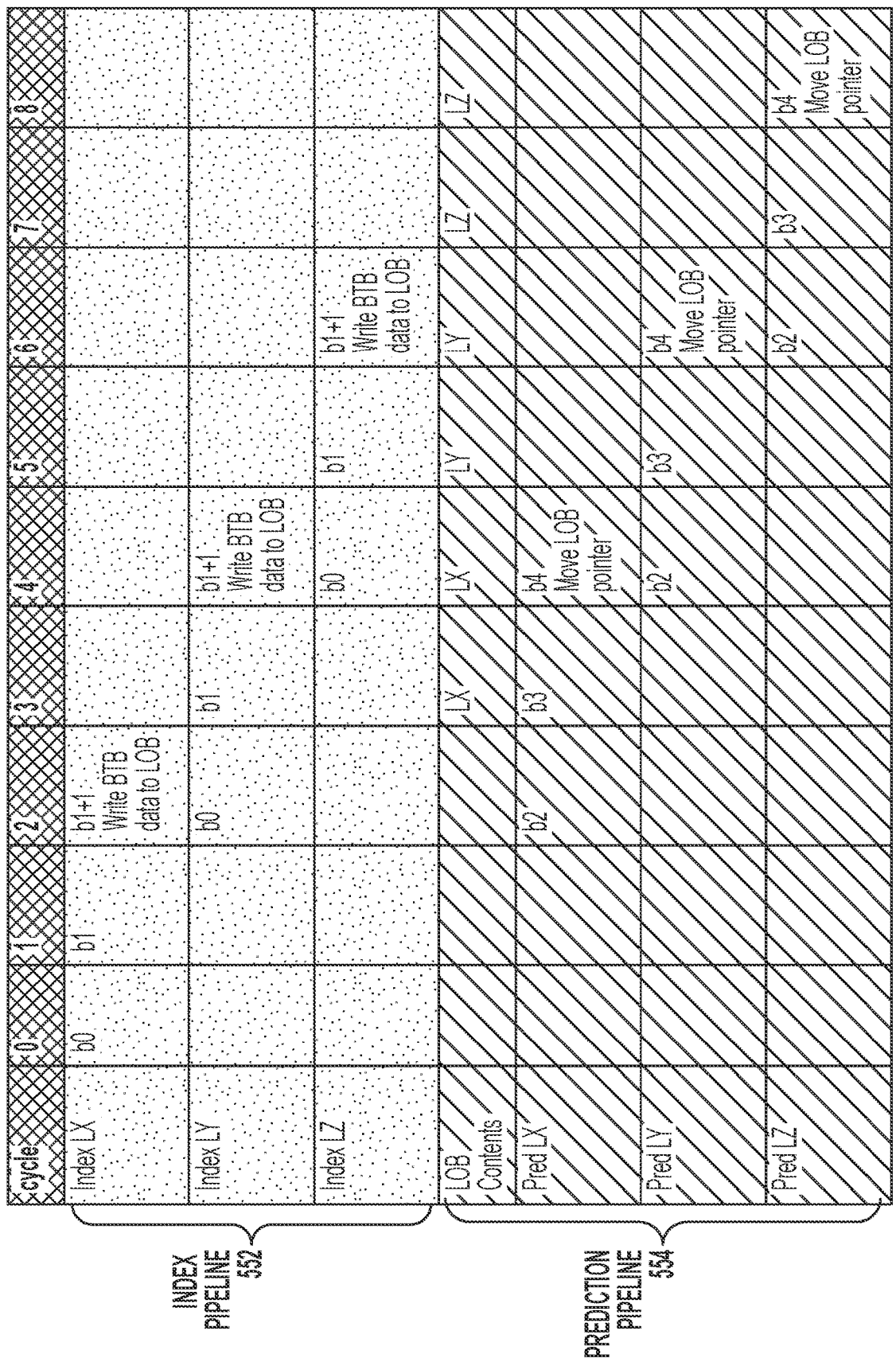
FIG. 7 depicts a block diagram of a pipeline illustration in accordance with one or more embodiments of the present invention.

FIG. 7 is a block diagram of a general pipeline illustration including index pipeline 552 and prediction pipeline 554 according to one or more embodiments. With reference back to the flow in FIG. 5, everything in orange (e.g., depicted with a dotted pattern) refers to processes on the left side of the dotted line and everything in green refers to processes on the right side of the dotted line. Each B0 (in orange) indicates that an entry is read from the LIB and that entry is being used to index the BTB1. Each B2 (in green, e.g., depicted with forward diagonal lines) indicates an entry has been read from the LOB and that entry is being to generate a prediction.

Figure 8:
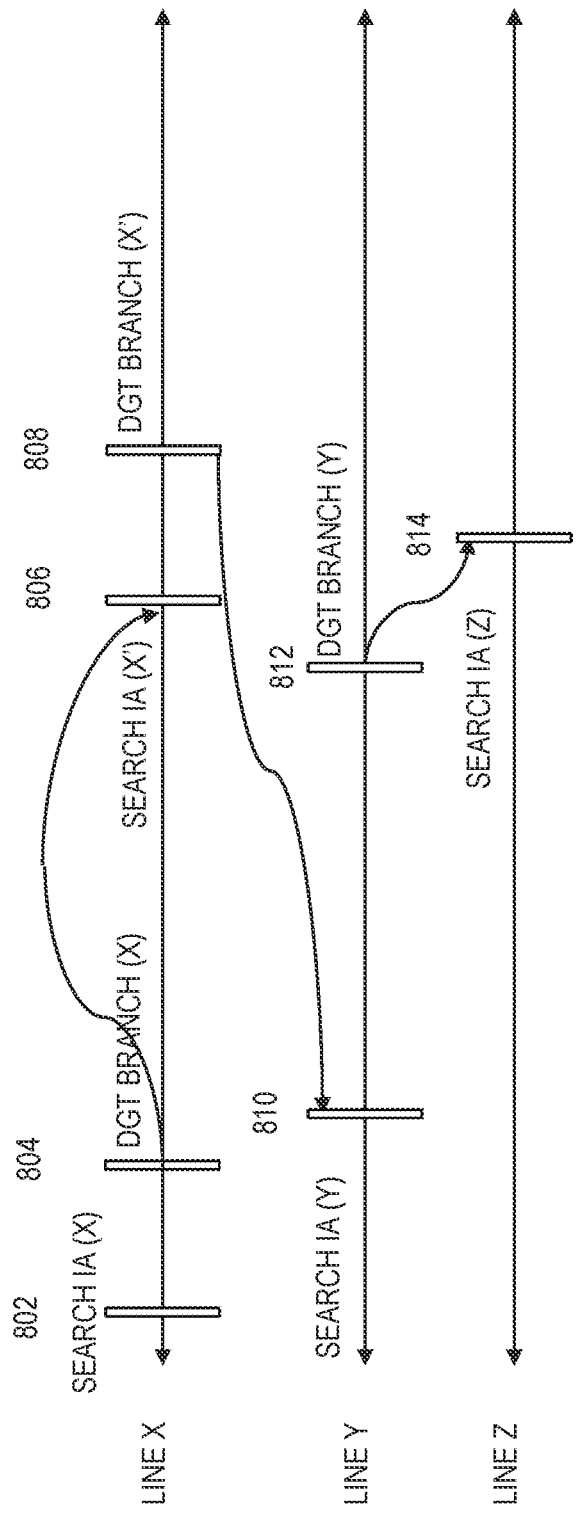
FIG. 8 depicts a block diagram of a metadata predictor cache example in accordance with one or more embodiments of the present invention.

FIG. 8 is a block diagram of a metadata predictor cache example according to one or more embodiments. FIG. 8 illustrates three lines of code which are line X, line Y, and line Z and which contain a dynamically guessed taken (DGT) branch. Information on these branches has been collected in the BTB1 202. FIG. 8 is an example of an intraline case. Using an index from LIB 204, metadata predictor 200 (e.g., using LOB logic 228) is configured to first search the instruction address of line X of code at event 802, which yields a dynamically guessed taken branch (DGT) at event 804 that takes metadata predictor 200 to another instruction address in line X of code (i.e., intraline). In prediction pipeline 554, metadata predictor 200 (e.g., using LOB logic 228) recognizes the intraline branch at event 804, and rather than going back to the BTB1 206 to refetch line X's metadata, LOB 208 (e.g., predictor cache) determines and allows metadata predictor 200 (e.g., using LOB logic 228) to reuse line X's metadata using a new start instruction (X') at event 806. At event 806, metadata predictor 200 (e.g., using LOB logic 228) searches the target instruction address (X') on the same line X of code having the metadata. This process of reusing the metadata of line X of code previously read out of LOB 208 without refetching the metadata from LOB 208 can continue as the loop 550 (depicted in FIG. 5) for numerous instruction addresses that branch to dynamically guessed taken branches, all on the same line X of code. This provides faster branch prediction. At some point, the loop 550 meets a condition to end because the dynamically guessed taken branch (X') at event 808, branches to a target instruction address that is not on line X of code, for example, on line Y of code. After branching to the target instruction address on line Y of code, metadata predictor 200 (e.g., using LOB logic 228) searches the target instruction address (Y) on line Y of code at event 810 and predicts (e.g., using prediction logic 230) the dynamically taken branch on line Y of code at event 812, which branches to line Z of code in LOB 208. After branching to the target instruction address on line Z of code, metadata predictor 200 (e.g., using LOB logic 228) searches the instruction address (Z) on line Z of code of LOB 208 at event 814, and the process continues.

Figure 9:
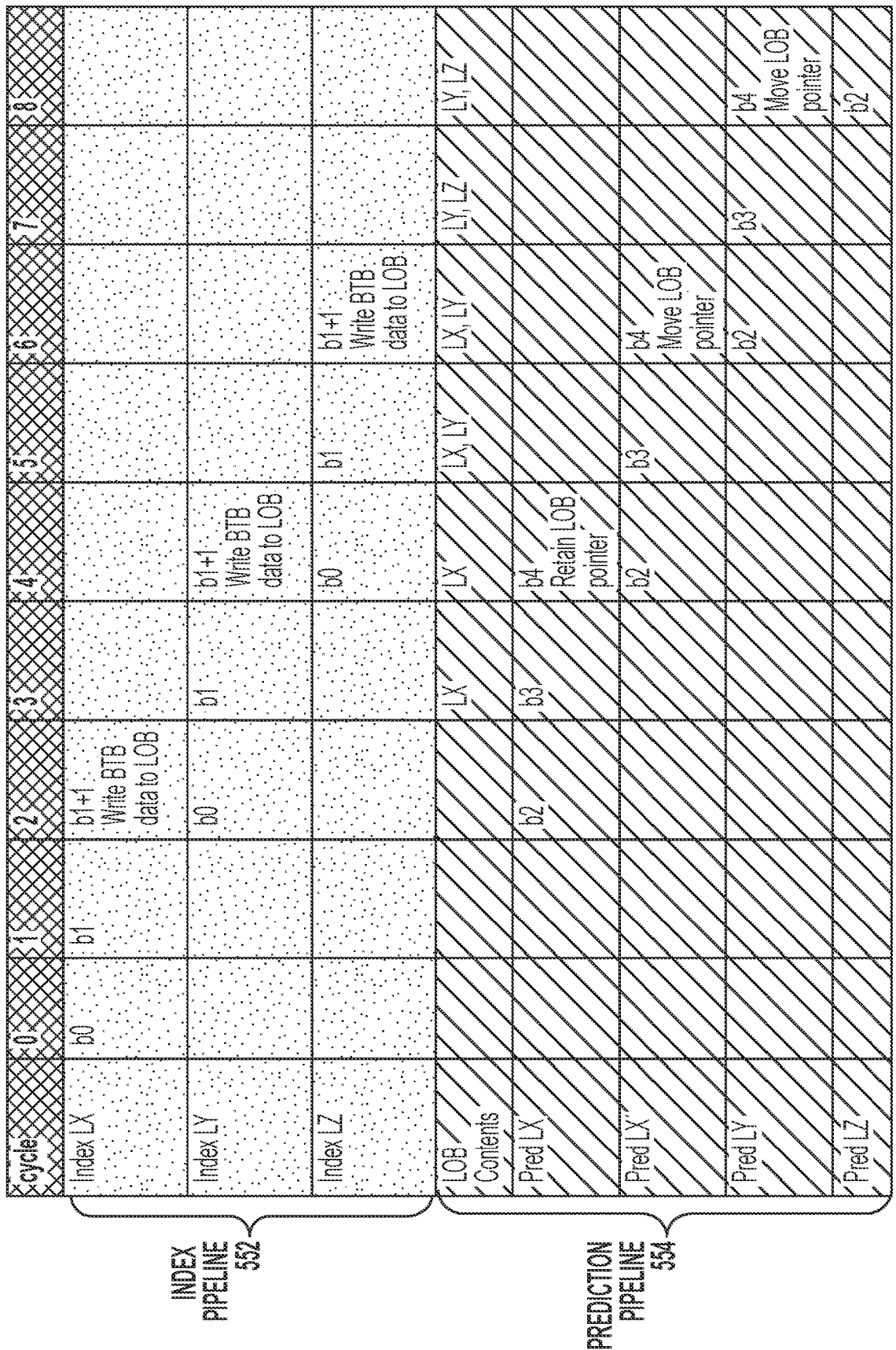
FIG. 9 depicts a block diagram of a pipeline illustration in accordance with one or more embodiments of the present invention.

FIG. 9 is a block diagram of a general pipeline illustration including index pipeline 552 and prediction pipeline 554 according to one or more embodiments. branches at event 604. Particularly, FIG. 9 illustrates an intraline example in which metadata predictor 200 predicted two branches off one read of LOB 208. Similar to FIG. 7, there two independent index and prediction pipelines. FIG. 9, however, is illustrating the intraline branch. While the behavior of the index pipeline 552 is unchanged, the prediction pipeline 554 is able to generate additional predictions without additional BTB1 accesses via the index pipeline.

Figure 10:
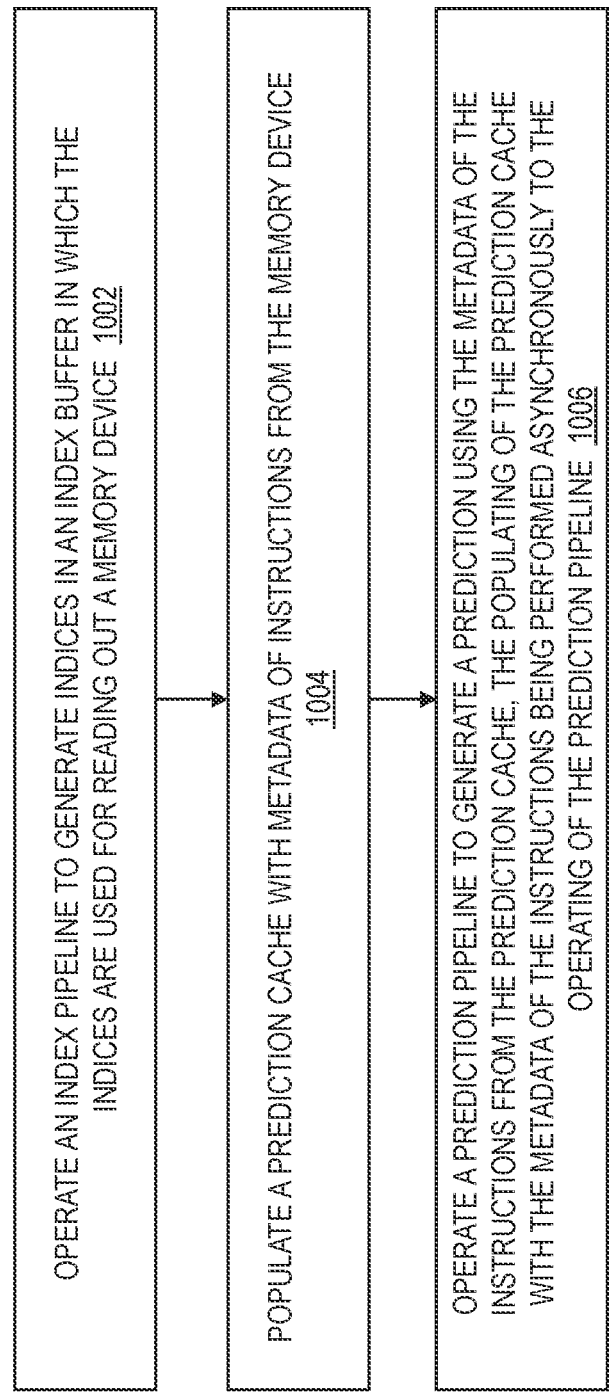
FIG. 10 is a flowchart of a computer-implemented method for using a metadata predictor in accordance with one or more embodiments of the present invention.

FIG. 10 is a flowchart of a computer-implemented method 1000 for using metadata predictor 200 to index BTB1 208, populate LOB 208, and generate a prediction in accordance with one or more embodiments of the invention. Computer-implemented process 1000 may be performed using computer system 100 in FIG. 1. Processors 101 in FIG. 1 along with or any other processor discussed herein can include and/or implement functions of processor 101 discussed herein. Functions of processor 101 can be used and/or implemented in hardware components of hardware and software layer 60 depicted in FIG. 31.

At block 1002 of computer-implemented method 1000, metadata predictor 200 is configured to operate an index pipeline 552 (e.g., using LIB logic 224) to generate indices in an index buffer (e.g., LIB 204) in which the indices are used for reading out a memory device (e.g., BTB1). At block 1004, metadata predictor 200 is configured to populating a prediction cache (e.g., LOB 208) with metadata of instructions from the memory device (e.g., BTB1). At block 1006, metadata predictor 200 is configured to operate a prediction pipeline 554 to generate a prediction using the metadata of the instructions from the prediction cache (e.g., LOB 208), the populating of the prediction cache with the metadata of the instructions being performed asynchronously to the operating of the prediction pipeline.

The populating of the prediction cache with the metadata of the instruction being performed asynchronously to the operating of the prediction pipeline comprises continually indexing the memory device (e.g., BTB1 206) to read out the metadata for the prediction cache independent of processes in the prediction pipeline. For example, metadata predictor 200 (e.g., using LIB logic 224) is configured to execute blocks 504, 506, 508, 510, 512 of index pipeline 552 in FIG. 5 which results in populating (or storing metadata in) LOB 208 with metadata from BTB1 206, without any prompting and independent of the execution of blocks 522, 524, 526, 528, 530, 532 in prediction pipeline 554 in FIG. 5.

The index buffer (e.g., LIB 204) is configured to read out the memory device (e.g., BTB1 206) with the metadata for the prediction cache without reliance on and in advance of generating the prediction (e.g., by prediction logic 230) using the metadata from the prediction cache (e.g., LOB 208). For example, metadata predictor 200 (e.g., using LIB logic 224) is configured to execute blocks 504, 506, 508, 510, 512 of index pipeline 552 in FIG. 5 which reads out metadata from BTB1 206 into LOB 208 without reliance on and in advance of generating the prediction results via prediction logic 230 at block 526 in prediction pipeline 554 in FIG. 5. The prediction pipeline 554 is configured to output a line of the metadata of the instructions from the prediction cache (e.g., LOB 208). For example, metadata predictor 200 (e.g., using LOB logic 228) is configured to read out a line of metadata from LOB 208 for further processing in prediction pipeline 554.

The prediction pipeline 554 is configured to continuously reuse a line of the metadata of the instructions from the prediction cache without having to re-access the memory device (e.g., BTB1). For example, metadata predictor 200 in processor 101 is configured to execute loop 550 including blocks 526, 528, 530 in prediction pipeline 554 without having to re-access (read out) LOB 208, when the dynamically guessed taken branch is intraline (i.e., on the same line of metadata previously read from LOB 208).

The prediction pipeline 554 is configured to continuously reuse a line of the metadata of the instructions that has been output from the prediction cache in order to generate a new prediction, responsive to a previous prediction being predicted to the (same) line of the metadata. For example, metadata predictor 200 in processor 101 is configured to execute loop 550 including blocks 526, 528, 530 in prediction pipeline 554 in order to continuously reuse a line of the metadata of the instructions that has been output from the LOB 208 in order to generate a new prediction using prediction logic 230 at block 526, in response to the previous prediction of the dynamically guessed taken branch being intraline (i.e., on the same line of metadata previously read from LOB 208).

The prediction is provided to an out-of-order instruction execution pipeline 250, the out-of-order instruction execution pipeline 250 operating in parallel to the index pipeline 552 and the prediction pipeline 554.

LIB 204 can be indexed as discussed herein. Additionally, line index accelerator 202 of metadata predictor 200 can be utilized to further populate LIB 204, allowing BTB1 to be accessed ahead of the prediction pipeline 554, thereby minimizing prediction latency. In one or more embodiments, an example implementation may use bits 48:56 of the instruction address to access the BTB1 because of the number of entries in the BTB1 could be 512. The example can stop at bit 56 because example implementation operates on 128 B lines (i.e. 57:63=7 bits, which corresponds to 128 B).

In accordance with one or more embodiments, line index accelerator 202 contains record of the next exit branch target (i.e., exit target instruction address) for a given entry point (i.e., entry instruction address). Records in line index accelerator 202 include indications of both line exit branches and consecutively accessed lines. For example, an array inside line index accelerator 202 can include information about line exit branches and sequential line usage. Line index accelerator 202 can include a sequential line offset engine that generates sequential line indices should they need to be accessed. Line index accelerator 202 uses this information to populate LIB 204 (which is used to index BTB1 206), thereby allowing BTB1 206 to be read ahead of prediction pipeline 554. Once BTB1 206 is read, the remaining exit branch's target address (i.e., the remainder of the target instruction address at the exit point for the branch) may be determined via an early target compare mechanism. This target compare mechanism may be referred to as a payload matching mechanism.

Figure 11:
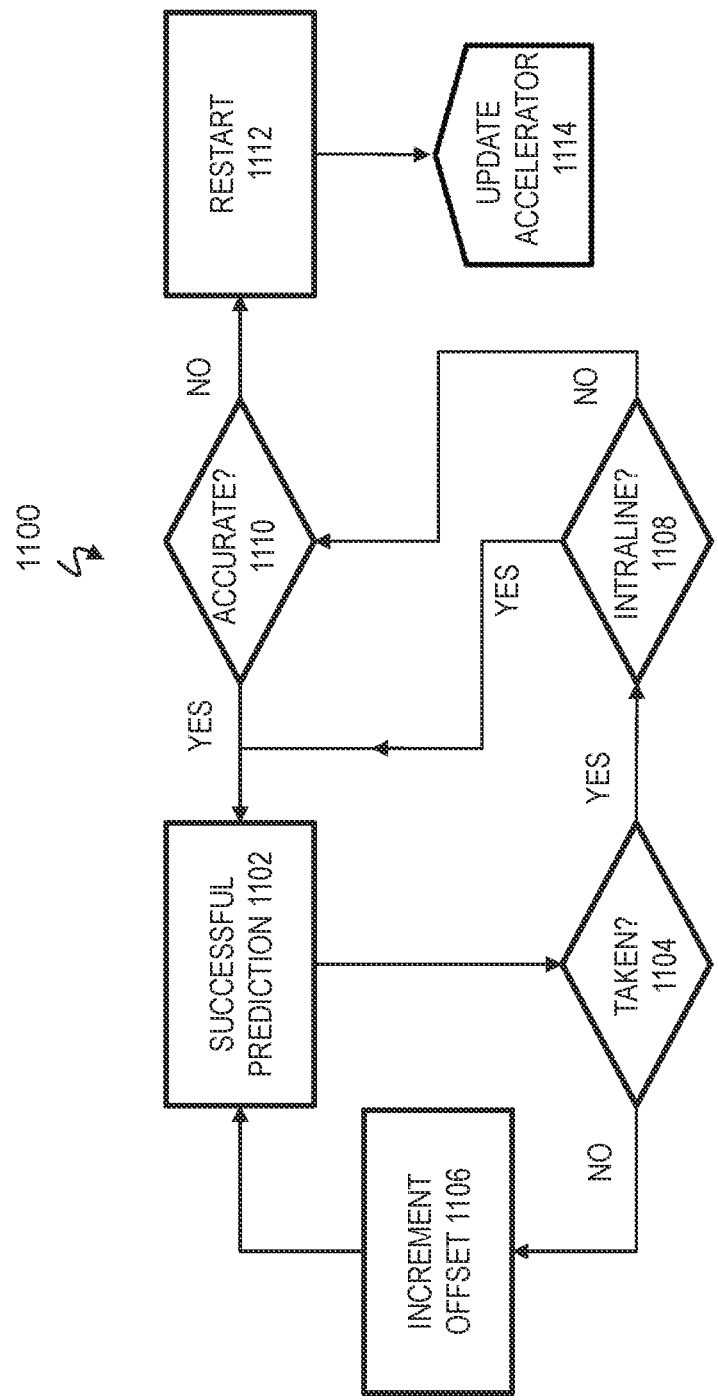
FIG. 11 is flowchart of an accelerator flow for writing to a line index accelerator in accordance with one or more embodiments of the present invention.

To illustrate details of line index accelerator 202 in metadata predictor 200, FIG. 11 is flowchart of an accelerator flow 1100 for writing to line index accelerator 202 according to one or more embodiments. Line index accelerator 202 can include and/or utilize accelerator logic 222 to perform accelerator flow 1100 as well as accelerator flow 1200 discussed below in FIG. 12.

At block 1102 of accelerator flow 1100, line index accelerator 202 is configured to receive a successful prediction. The successful prediction can be received as output from prediction pipeline 554 and/or from instruction execution pipeline 250. The successful prediction can be for an instruction address having a branch, which could be taken or not taken. At block 1104, line index accelerator 202 is configured to check whether the branch was taken or not taken. If ("No") the branch was not taken, line index accelerator 202 is configured to increment the offset at block 1106, and flow returns to block 1102. Nothing is written to line index accelerator 202. Incrementing the offset refers to processing the next line of metadata that is prepared to be stored in the line index accelerator because the line index accelerator did not find a taken branch. If "Yes" the branch was taken, line index accelerator 202 is configured to check if the branch taken was intraline at block 1108. As noted herein, intraline refers to the target address being on the same line of metadata as the instruction address being searched (i.e., the entry instruction address and target address are on the same line of metadata). If "Yes" the target address for the branch taken is intraline, line index accelerator 202 is configured to return to block 1102, and nothing is written to line index accelerator 202. On the other hand, if ("No") the target address for the branch taken is not intraline, line index accelerator 202 is configured to check if the target address for the branch taken is accurate at block 1110. If "Yes" the target address is accurate, flow proceeds to block 1102, and nothing is written to line index accelerator 202. In other words, the next line needed for the target address is already in the index pipeline 552 and prediction pipeline 554. If ("No") the target address for the branch taken is not accurate, line index accelerator 202 is configured to restart the line index accelerator 202 at block 1112, and update line index accelerator 202 at block 1114. Further, the restart event restarts all the pipelines, including the accelerator, index, and prediction pipelines. Updating line index accelerator 202 can include adding the correct target address for the branch taken such that the correct target address will be available for the branch taken. Also, updating line index accelerator 202 can include updating the branch offset and any tag information used to determine a hit.

Figure 12:
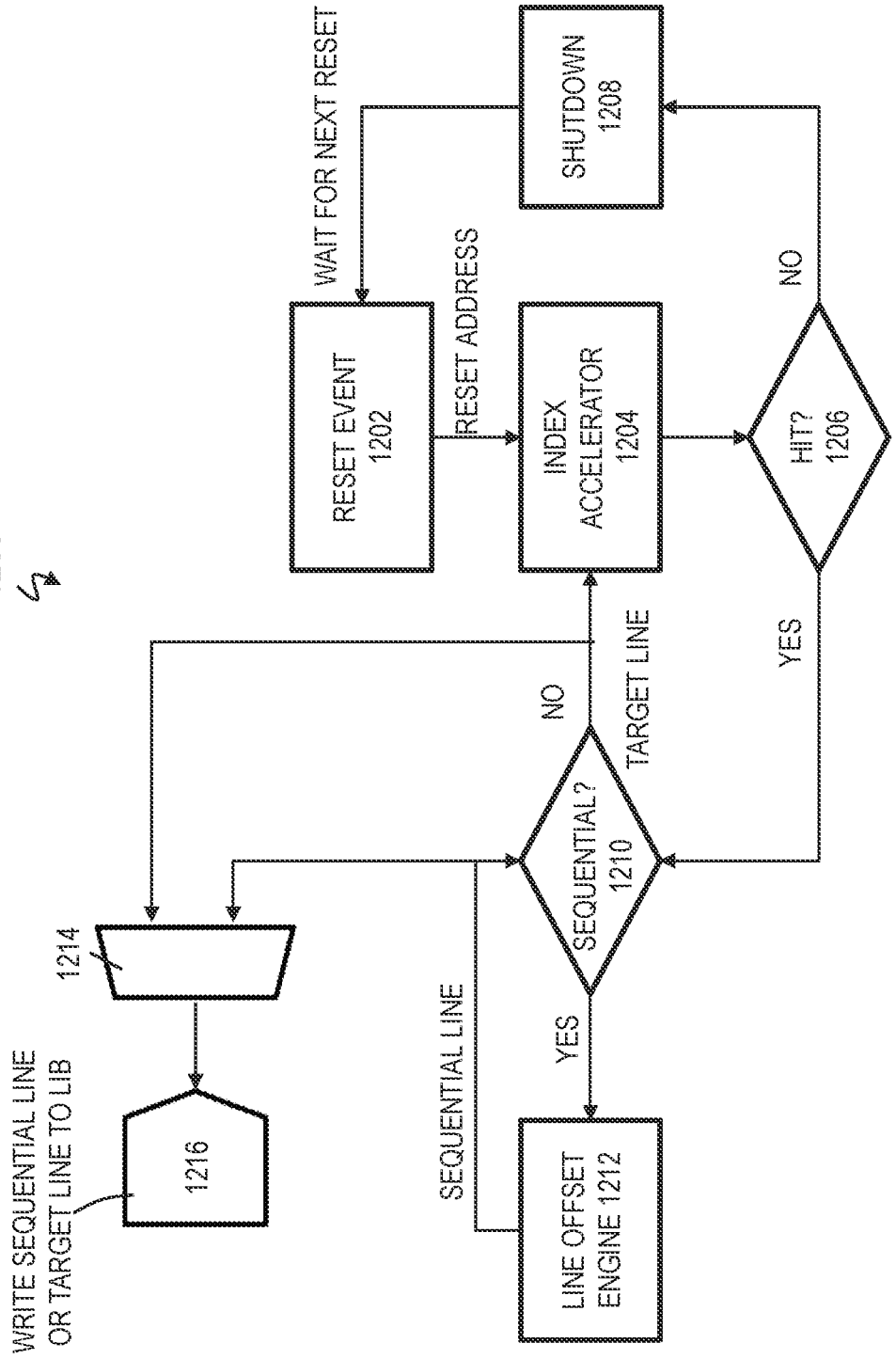
FIG. 12 is flowchart of an accelerator flow for reading a line index accelerator in accordance with one or more embodiments of the present invention.

FIG. 12 is flowchart of an accelerator flow 1200 for reading out line index accelerator 202 to LIB 204 according to one or more embodiments. Line index accelerator 202 can include and/or utilize accelerator logic 222 to perform accelerator flow 1200. At block 1202 of accelerator flow

1200, line index accelerator 202 is configured to receive a reset event, which has an instruction address as the reset address. An example reset event can be a branch wrong. At block 1204, line index accelerator 202 is configured to use the reset address to index (e.g., query) line index accelerator 202. At block 1206, line index accelerator 202 is configured to check whether the reset address is a hit in line index accelerator 202. If ("No") there is no hit from the instruction address (i.e., the reset address), line index accelerator 202 is configured to shut down line index accelerator 202 and wait from the next reset address at block 1208. If "Yes" there is a hit from the instruction address (i.e., the reset address), line index accelerator 202 is configured to check if the line read out from line index accelerator 202 needs a sequential line at block 1210. If ("No") the line read out from line index accelerator 202 does not need a sequential line, line index accelerator 202 is configured to multiplex the line (i.e., the target line) that was read out at block 1214 such that the line is written to LIB 204 at block 1216. Also, flow returns to block 1204 such that the line (i.e., the target line) that was read out is used to query/index line index accelerator 202 for the next exit branch.

If "Yes" the line read out from line index accelerator 202 needs a sequential line, line index accelerator 202 is configured to perform line offset in order to output the sequential line at block 1212. At block 1214, line index accelerator 202 is configured to multiplex the sequential line to LIB 204 and write the sequential line to LIB 204 at block 1216. For example, if the line read out from line index accelerator 202 is line X, line index accelerator 202 is configured to perform line offset to obtain line X+1, where line X+1 corresponds to a subset of instruction address bits needed to search for line X+1 in BTB1 206; therefore, line index accelerator 202 causes line X+1 to be stored immediately after line X in LIB 204. Performing the line offset refers to adding a predetermined number of bits to the previous line (e.g., line X) in order create the sequential line (e.g., line X+1) which is used as the index to query the corresponding line of metadata for the sequential line in BTB1 206. Since each line of metadata in BTB1 206 is in a known format (e.g., the line of metadata is 128 B), the offset is a fixed amount to move to the next line (i.e., the sequential line). The sequential line (e.g., sequential line X+1) is fed back to block 1210; line index accelerator 202 is configured to check whether another sequential line is needed, and if so the line offset is added at block 1212, in order to generate the next sequential line such as, for example, sequential line X+2. This loop can continue for three times in one or more embodiments, resulting in sequential lines X+1, X+2, X+3 each of which is written to LIB 204. In one or more embodiments, sequential lines X+1, X+2, X+3 can be written serially to LIB 204. In one or more embodiments, sequential lines X+1, X+2, X+3 can all be written at simultaneously, for example, in parallel to LIB 204.

Figure 13:
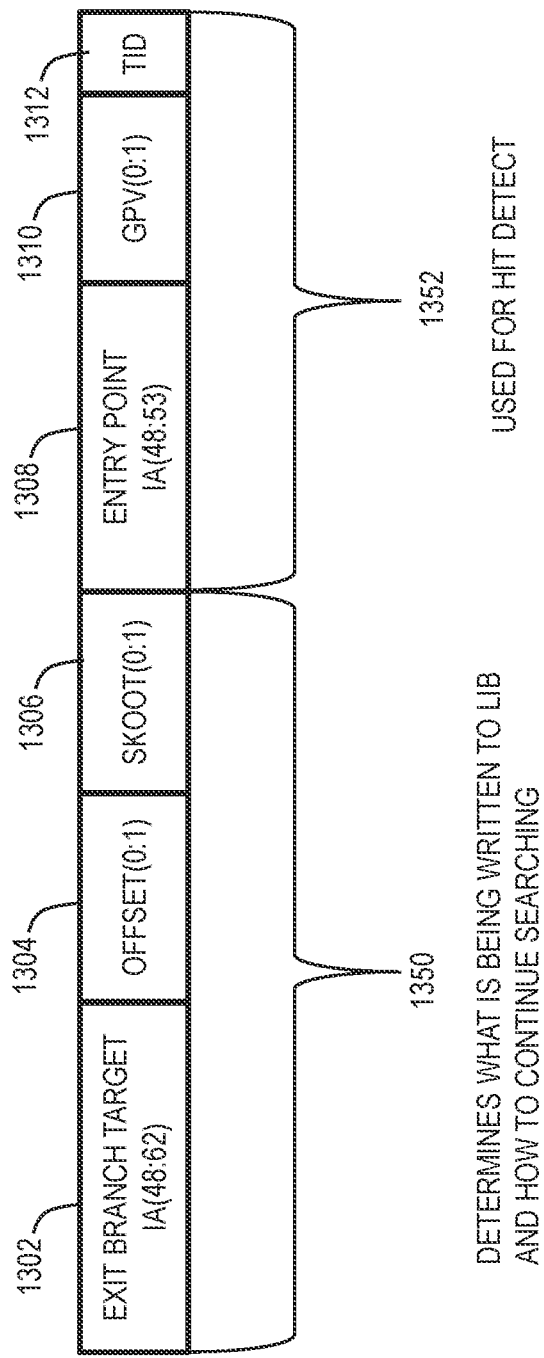
FIG. 13 depicts a block diagram of an example latency accelerator entry of a line index accelerator in accordance with one or more embodiments of the present invention.

FIG. 13 is a block diagram of an example latency accelerator entry of line index accelerator 202 in accordance with one or more embodiments. The example accelerator entry has a first part 1350 that is used to determine what is written (stored) to LIB 204 and how to continue searching line index accelerator 202. Once line index accelerator 202 no longer needs to generate sequential lines, the target of the exit branch, which will be the entry point of the next search, is fed back to line index accelerator 202 to read a new line. The first part 1350 of example accelerator entry includes the exit branch target field 1302, for example, as instruction address bit 48:62, the offset field 1304 as bits 0:1, and the SKOOT field 1306 as bits 0:1.

The second part 1352 of the example accelerator entry is used for hit detection within line index accelerator 202. The second part 1352 includes an entry point field 1308, for example, as instruction address bits 48:53, a global path vector (GPV) field 1310 as instruction address 0:1, and a transaction register (TID) field 1312.

Figure 14:
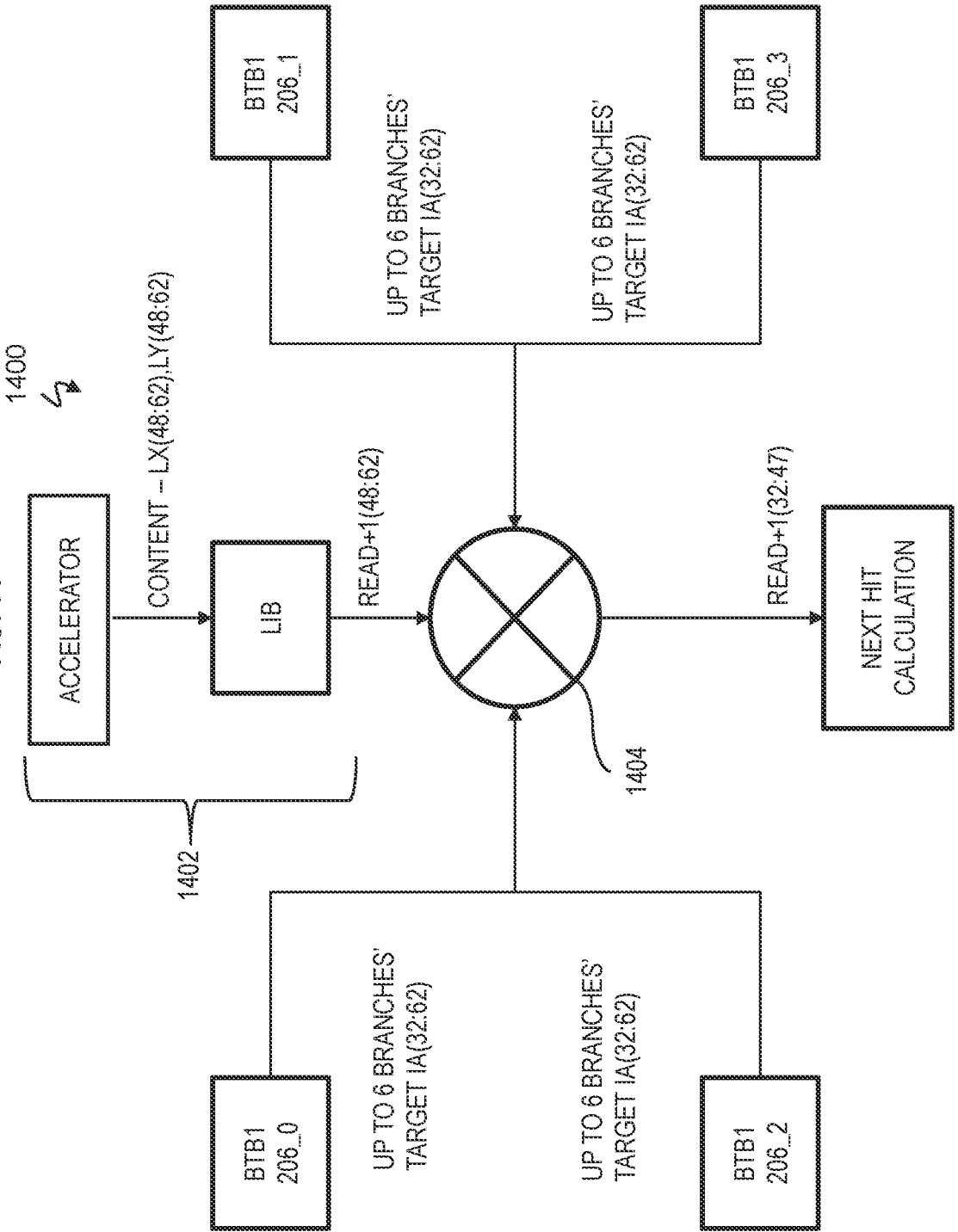
FIG. 14 is flowchart of an accelerator flow for performing payload matching in accordance with one or more embodiments of the present invention.

FIG. 14 is flowchart of an accelerator flow 1400 for performing payload matching according to one or more embodiments. Line index accelerator 202 can include and/or utilize accelerator logic 222 to perform accelerator flow 1400. Payload matching combines BTB1 data with accelerator data in order to find instruction address bits required for hit detection. At blocks 1402, 1404 of accelerator flow 1400, line index accelerator 202 is configured to populate LIB 204 using content, which is instruction address bits for line of metadata and to "OR" the output. In one or more embodiments, line index accelerator 202 could multiplex (mux) the output from BTB1. The LIB 204 operates on its own. If LIB 204 contains valid entries that have not yet been used to index the BTB1, then LIB 204 will send them to the BTB1 for indexing; once the BTB1 has been read, that content will be used, in conjunction with the next LIB entry, for payload matching. For example, payload matching uses the IA(48:62) of two LIB entries (which are X(48:62) and Y(48:62) in this example to find Y(32:47), where Y(32:47) is needed for the next search. While line index accelerator 202 does not need Y(32:47) to query the BTB1 during the next search, line index accelerator 202 will need Y(32:47) for hit detection, for example, in block 514 discussed herein. The tags are bits Y(32:47) of the current search line. The BTB1 contains bits 32:47 of the 128B line that has been read out (e.g., which may be called BTB1(32:47). In order to determine that there is a hit, Y(32:47) and BTB1(32:47) must match, otherwise, what has been read is for a different line. Payload matching looks at all of the target addresses of the current search X, in order to find Y(32:47) for the next search. The BTB1 206 can be operated in a parent-based design, where BTB1 206 is split or operated in four quadrants BTB1 206_0, BTB1 206_1, BTB1 206_2, BTB1 206_3 (generally referred to as BTB1 206). After being indexed (e.g., searched), each BTB1 206_0, BTB1 206_1, BTB1 206_2, BTB1 206_3 provides its output. In one or more embodiments, each BTB1 206_0, BTB1 206_1, BTB1 206_2, BTB1 206_3 can output the target instruction address bit (32:62) for up to six branches.

Figure 15:
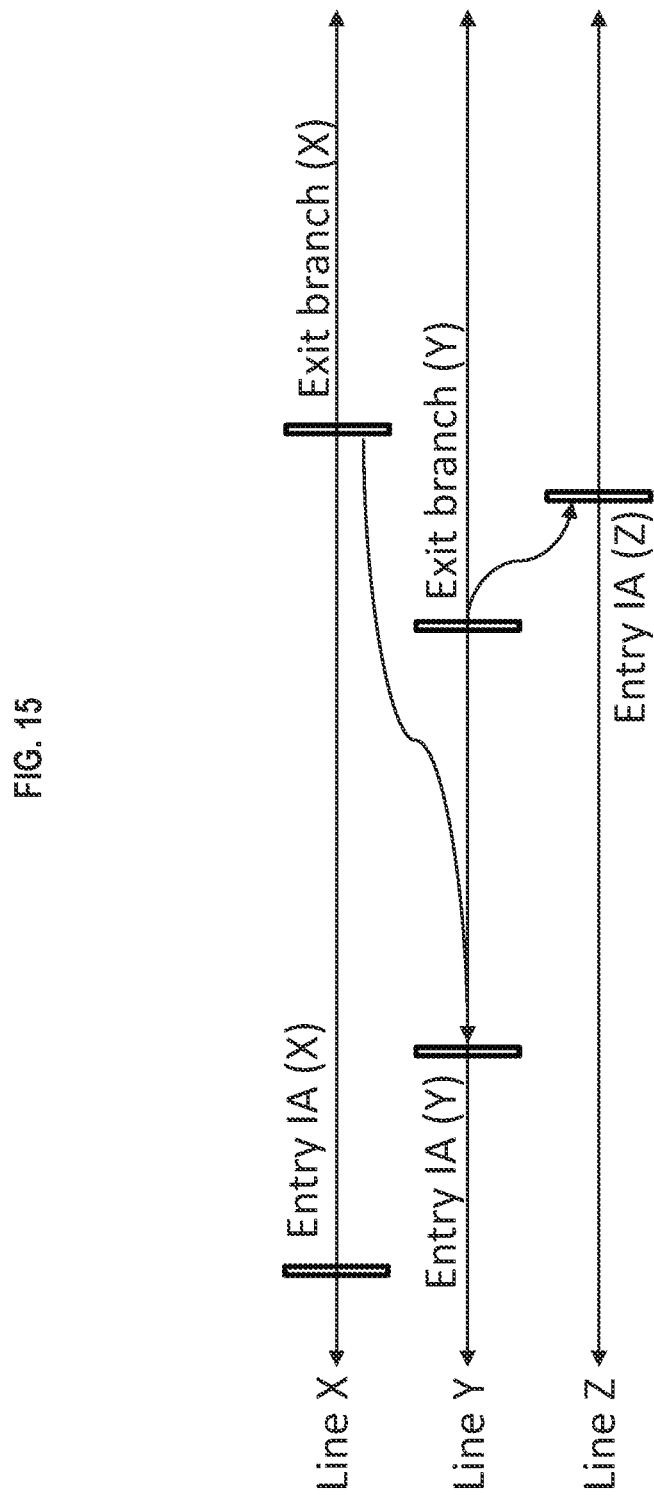
FIG. 15 depicts a block diagram of an accelerator example in accordance with one or more embodiments of the present invention.

FIG. 15 is a block diagram of an accelerator example according to one or more embodiments. FIG. 15 illustrates three lines of code which are line X, line Y, and line Z (with branches) in line index accelerator 202. Information (i.e., metadata) on these branches has been collected in the BTB1 202. In the index pipeline 552, line index accelerator 202 is configured to be indexed (e.g., queried) with entry instruction address (X) for line X, resulting in line index accelerator 202 finding the pointer to entry instruction address (Y) for line Y. Accordingly, line index accelerator 202 is configured to write entry instruction address (Y) for line Y in LIB 204. Also, the entry instruction address (X) for line X has an exit branch on line X.

Line index accelerator 202 is configured to be indexed with entry instruction address (Y) for line Y, resulting in line index accelerator 202 finding the pointer to entry instruction address (Z) for line Z. Accordingly, line index accelerator 202 is configured to write entry instruction address (Z) for line Z in LIB 204. The entry instruction address (Y) for line Y has an exit branch on line Y. Further, line index accelerator 202 is configured to be indexed with entry instruction address (Z) for line Z, and the process continues.

Figure 16:
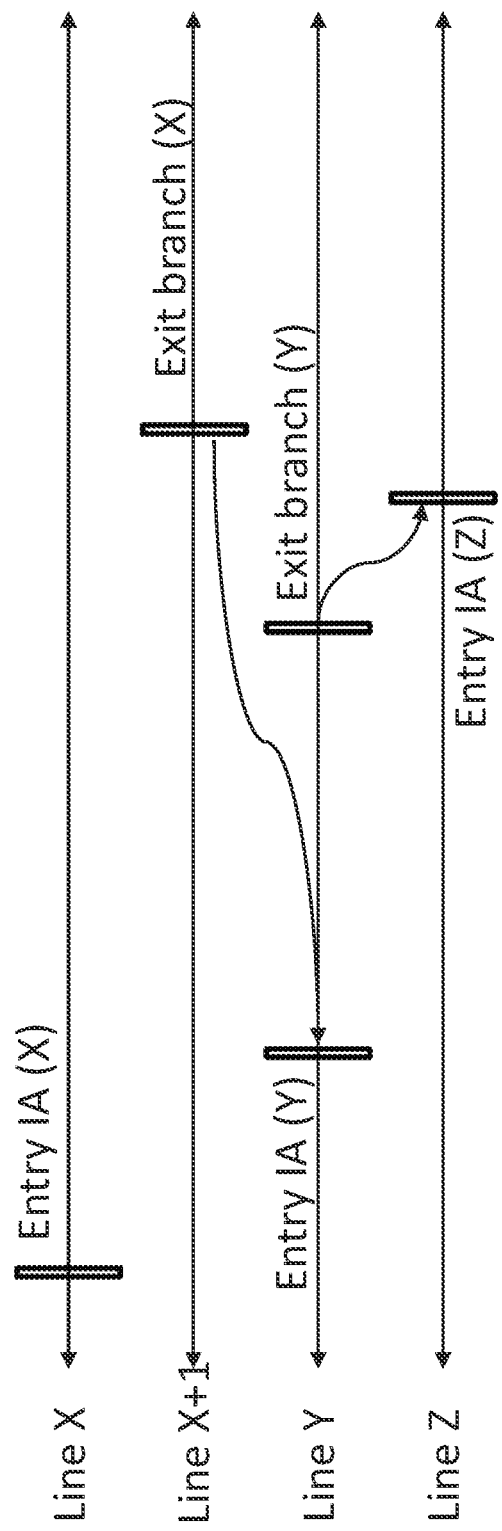
FIG. 16 depicts a block diagram of an accelerator example in accordance with one or more embodiments of the present invention.

FIG. 16 is a block diagram of an accelerator example according to one or more embodiments. FIG. 16 illustrates four lines of code in line index accelerator 202, where use of sequential lines is depicted. Information (e.g., metadata) on these branches has been collected in the BTB1 202. In the index pipeline 552, line index accelerator 202 is configured to be indexed with entry instruction address (X) for line X, resulting in line index accelerator 202 finding the pointer to entry instruction address (Y) for line Y. To find the pointer to entry instruction address (Y) on line Y, line index accelerator 202 is configured to determine that entry instruction address (X) for line X indicates that a sequential line is needed (e.g., as discussed in block 1210 in FIG. 12). Line index accelerator 202 is configured to generate sequential line X+1 and write sequential line X+1 to LIB 204 (e.g., as discussed in blocks 1212, 1214, 1216 in FIG. 12). The loop of blocks 1210, 1212, 1214, 1216 may continue three time resulting in sequential lines X+1, X+2, X+3. However, only sequential line X+1 is depicted in FIG. 16. It is noted that sequential line X+1 is subsequent to line X (i.e., the next consecutive line), but before line Y. The same applies by analogy to lines X+1 and X+2. In another case, line index accelerator 202 would write each of the sequential lines X+1, X+2, X+3 to LIB 204. Returning to the example in FIG. 16, subsequently, line index accelerator 202 writes entry instruction address (Y) to LIB 204.

Line index accelerator 202 is configured to be indexed with entry instruction address (Y) for line Y (e.g., depicted as flow returning from block 1210 to block 1204 in FIG. 12), resulting in line index accelerator 202 finding the pointer to entry instruction address (Z) for line Z. Accordingly, line index accelerator 202 is configured to write entry instruction address (Z) to LIB 204. Further, line index accelerator 202 is configured to be indexed with entry instruction address (Z) for line Z, and the process continues.

Figure 17:
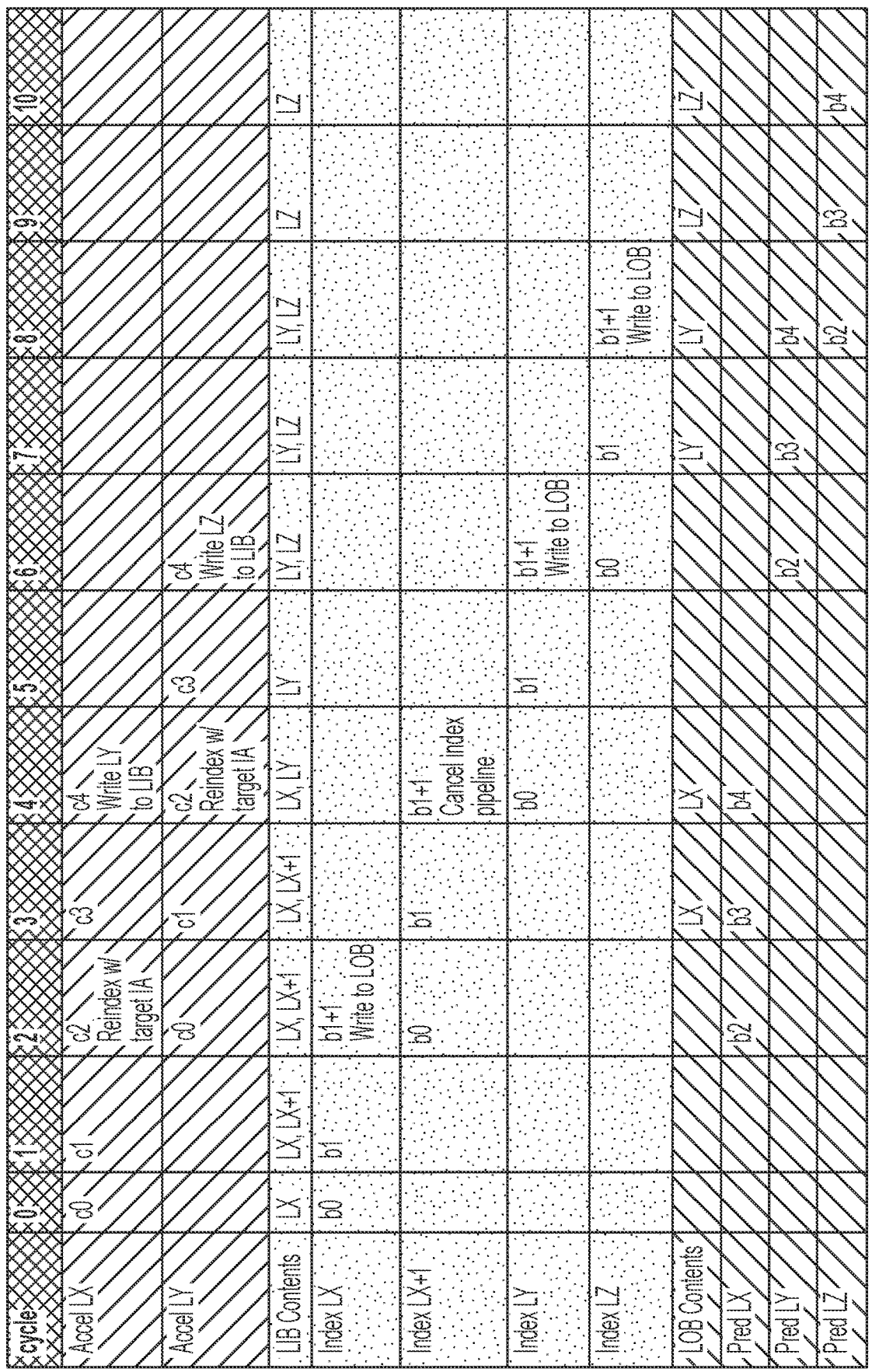
FIG. 17 depicts a block diagram of a pipeline illustration including the line index accelerator with no line offset in accordance with one or more embodiments of the present invention.

FIG. 17 is a block diagram of a pipeline illustration including the line index accelerator with no line offset in accordance with one or more embodiments. In this example, line index accelerator 202 has been populated. FIG. 17 is similar to the pipeline diagrams described above in FIGS. 7 and 9, but now the line index accelerator 202 has been added in the mix (e.g., the yellow blocks depicted as backward diagonal lines). Upon reset both the index and accelerator pipelines start using the reset address. At cycle 1, since the accelerator has not yet completed 1 pass of the pipeline, the index pipeline writes line X+1 to the LIB (e.g., depicted as block 512 in FIG. 5). At cycle 4, line index accelerator 202 finds that it does not need line X+1, but line Y instead; hence, the index pipeline for line X+1 is cancelled, the LIB entry for line X+1 is replaced with line Y, and the B0 for line Y is started. Since the X+1 search was cancelled with new information from line index accelerator 202, this does create a bubble in the delivery of predictions (no B4 on cycle 6).

Figure 18:
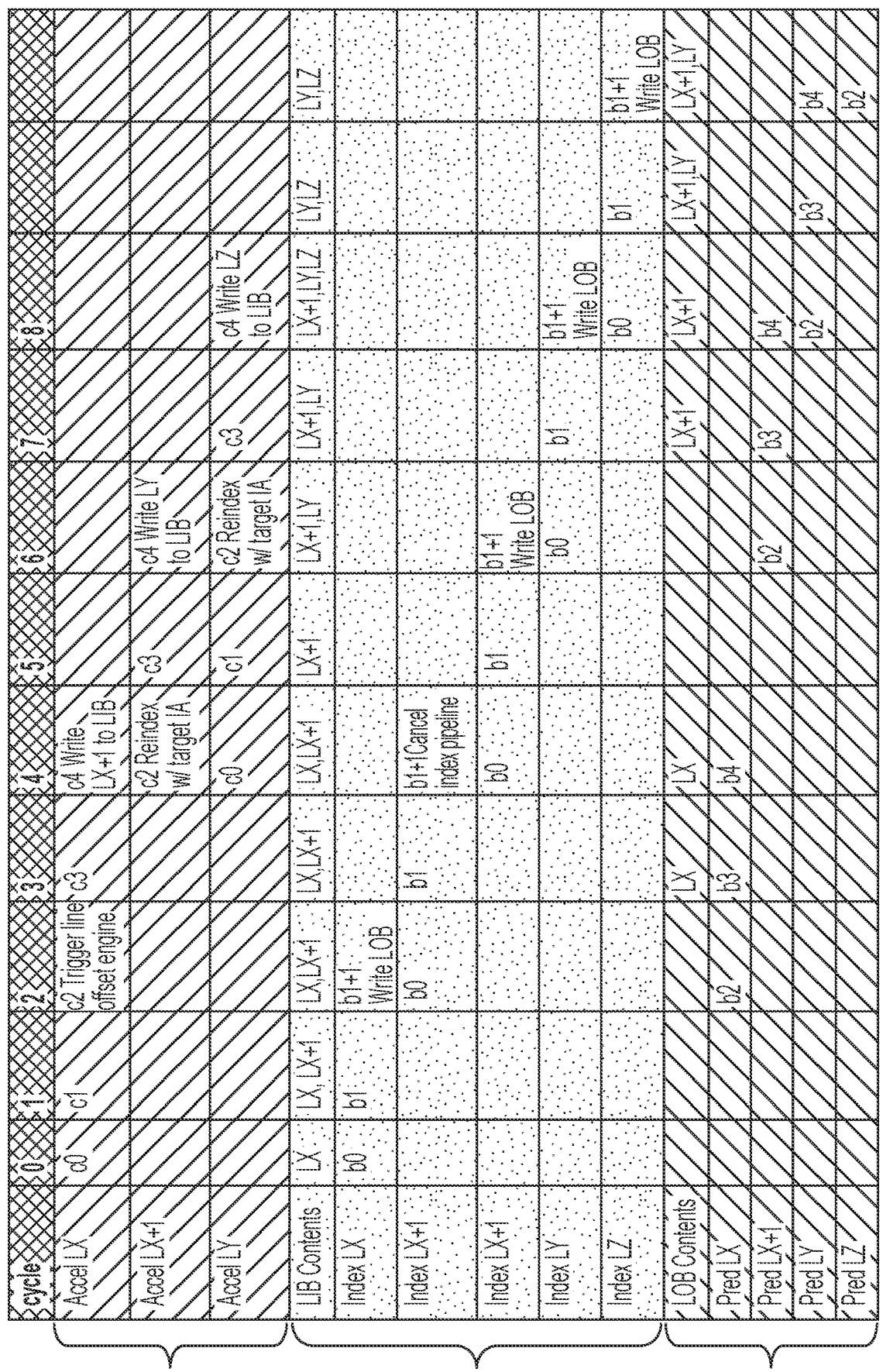
FIG. 18 depicts a block diagram of a pipeline illustration including the line index accelerator with line offset in accordance with one or more embodiments of the present invention.

FIG. 18 is a block diagram of a pipeline illustration including the line index accelerator with line offset in accordance with one or more embodiments. In this example, line index accelerator 202 has been populated. FIG. 18 is similar to FIG. 17, but now FIG. 18 adds a sequential line into the mix. In one example case, even though line index accelerator 202 finds that it wants line X+1, it blindly cancels the already started X+1 index pipeline (started on cycle 2) and triggers another one 2 cycles later, yielding the same prediction delivery bubble that was in FIG. 17.

Figure 19:
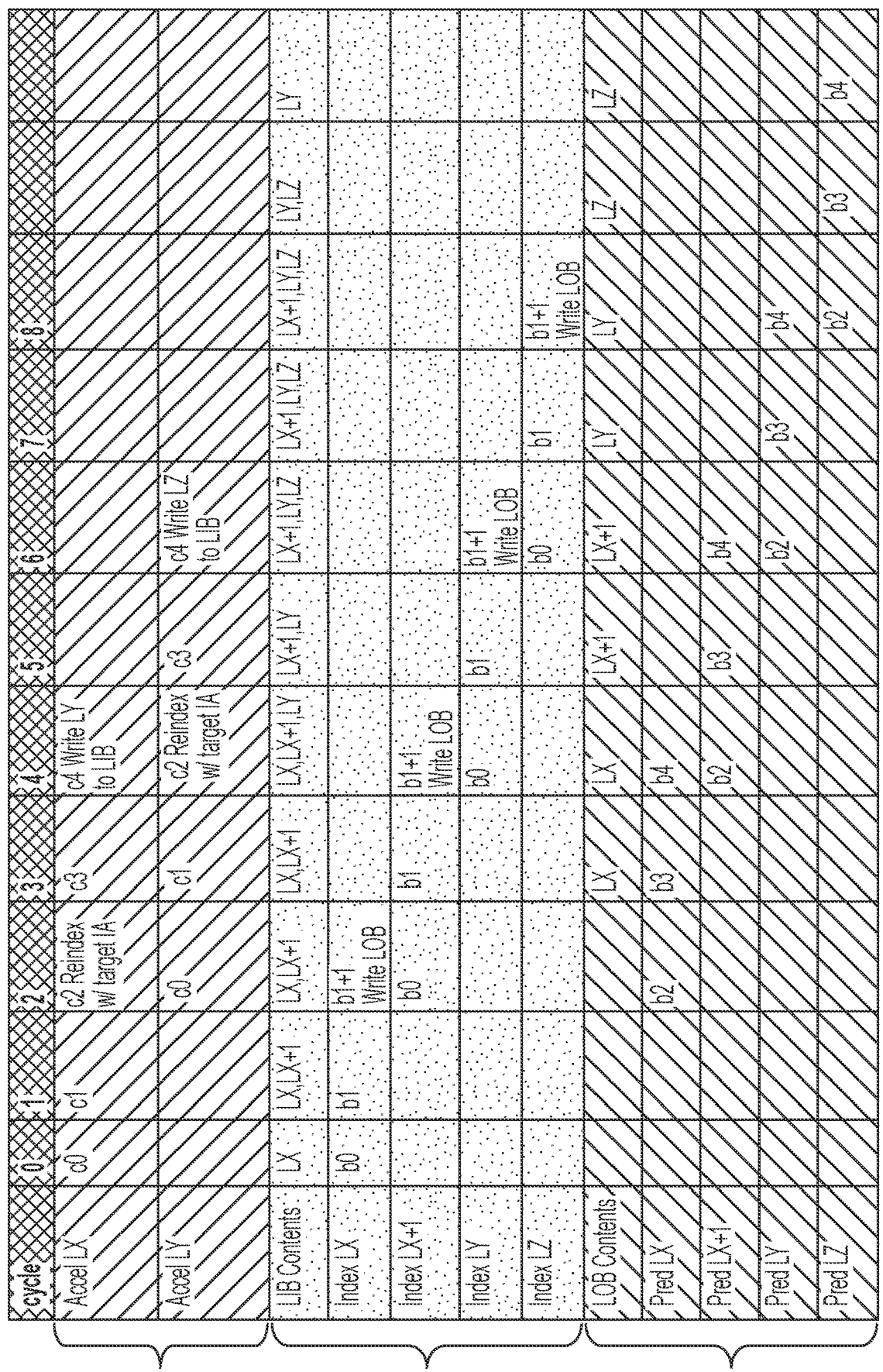
FIG. 19 depicts a block diagram of a pipeline illustration including the line index accelerator with line offset in accordance with one or more embodiments of the present invention.

FIG. 19 is a block diagram of a pipeline illustration including the line index accelerator with line offset in accordance with one or more embodiments. In this example, line index accelerator 202 has been populated. FIG. 19 represents a fix and/or added efficiency to the example in FIG. 18. As such, line index accelerator 202 performing the accelerator pipeline is configured to recognize that a reset search does not need to generate an X+1 line for the LIB, because the X+1 line will happen automatically. So, rather than generating an X+1 LIB write, line index accelerator 202 writes line Y to the tail of the LIB. In another case, it is assumed that the initial accelerator search found that 2 sequential lines were required, line index accelerator 202 would have written X+2 and Y to the LIB. By fixing this potential issue, the index pipeline search of X+1 is not cancelled, and no prediction bubble occurs.

Figure 20:
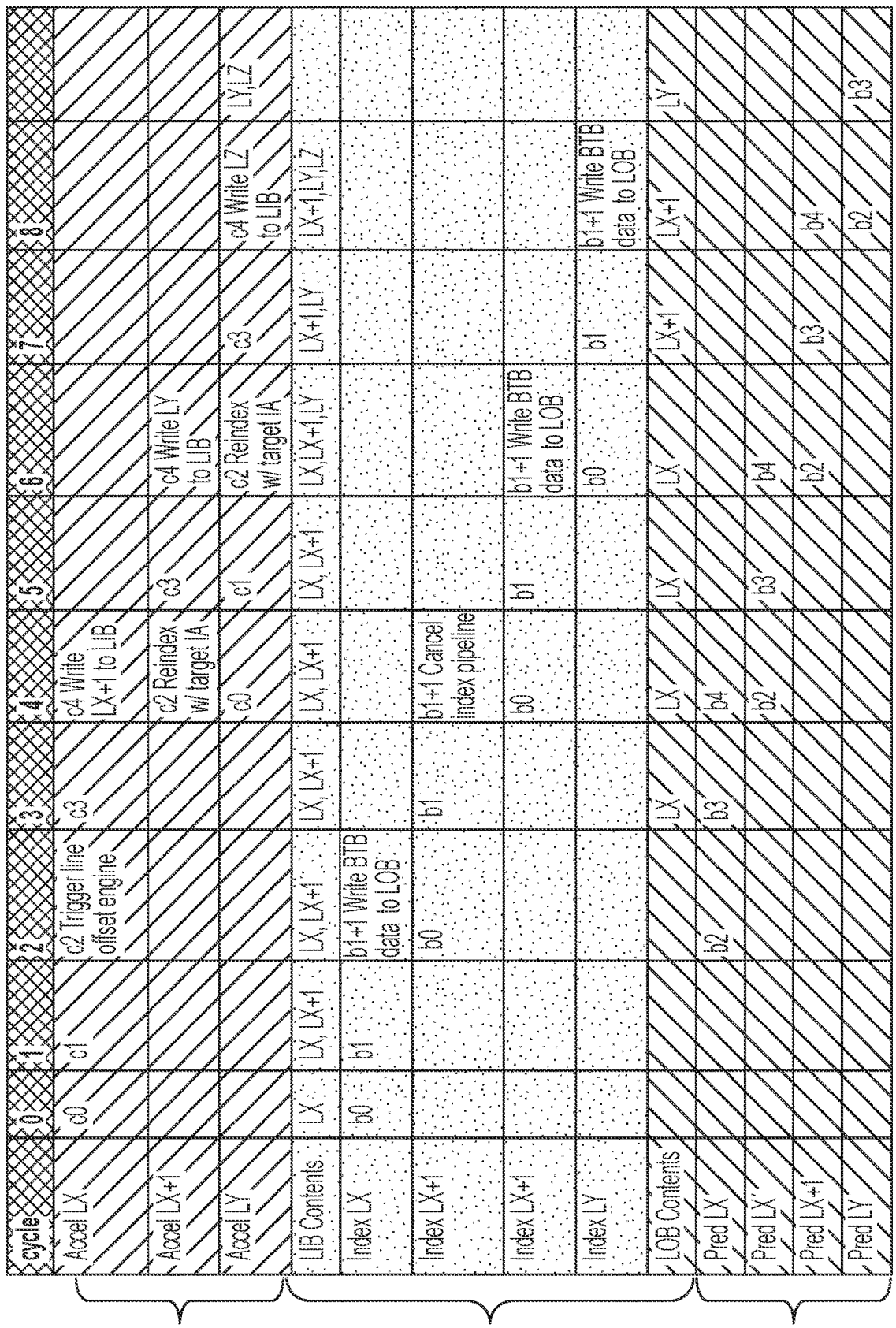
FIG. 20 depicts a block diagram of a pipeline illustration including the line index accelerator with line offset and intraline branch in accordance with one or more embodiments of the present invention.

FIG. 20 is a block diagram of a pipeline illustration including the line index accelerator with line offset and intraline branch in accordance with one or more embodiments. In this example, line index accelerator 202 has been populated. Similar to FIG. 18, FIG. 20 has now added an intraline branch into the mix such that line X is accessed twice. Because line X had an intraline branch, the prediction bubble created by the potential issue in FIG. 18 is hidden. Regardless of fixing the X+1 potential issue that exists, the prediction bubble may still exist from FIG. 17. However, the presence of an intraline branch would hide that bubble.

Figure 21:
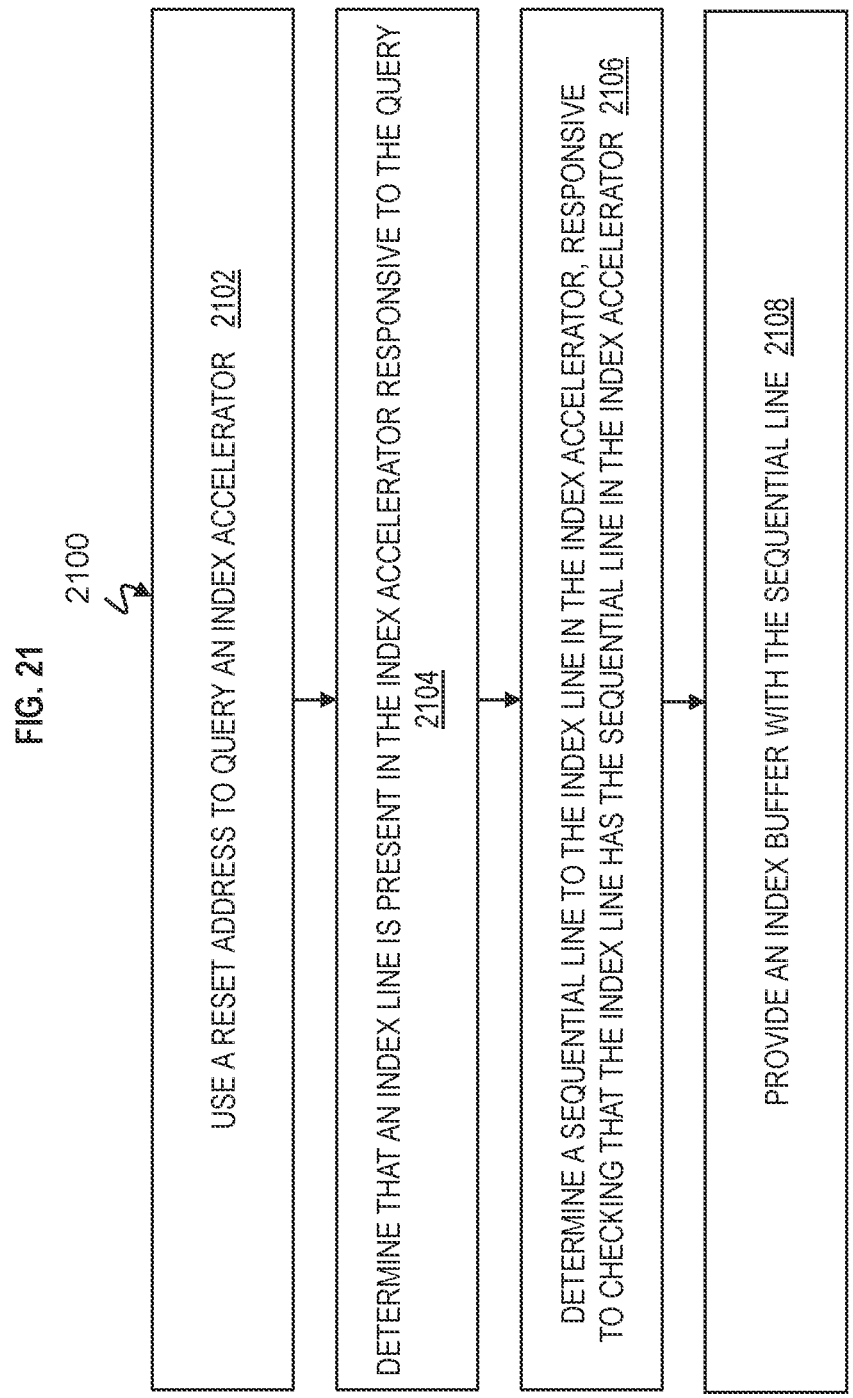
FIG. 21 is a flowchart of a computer-implemented method for using the line index accelerator to determine indices for a line index buffer in the metadata predictor in accordance with one or more embodiments of the present invention.

FIG. 21 is a flowchart of a computer-implemented method 2100 for using line index accelerator 202 to determine indices for LIB 204 in metadata predictor 200 before the indices are needed to read out BTB1 206 to LOB 208 in accordance with one or more embodiments of the invention. Computer-implemented method 2100 may be performed using computer system 100 in FIG. 1. Processors 101 in FIG. 1 along with or any other processor discussed herein can include and/or implement functions of metadata predictor 200 discussed herein. As noted herein, functions of processor 101 can be used and/or implemented in hardware components of hardware and software layer 60 depicted in FIG. 31.

At block 2102 of computer-implemented method 2100, metadata predictor 200 is configured to use a reset address to query an index accelerator (e.g., line index accelerator 202). At block 2104, metadata predictor 200 is configured to determine that an index line (e.g., line X) is present in the index accelerator (e.g., line index accelerator 202) responsive to the query. At block 2106, metadata predictor 200 is configured to determine a sequential line to the index line in the index accelerator (e.g., line index accelerator 202), responsive to checking that the index line has the sequential line in the index accelerator. For example, line index accelerator 202 is configured to check that it contains a sequential line, for example, sequential line X+1, to the index line (e.g., line X) as depicted in block 1210 in FIG. 12. At block 2108, metadata predictor 200 is configured to provide (write) an index buffer with the sequential line.

The index accelerator is configured to determine one or more other sequential lines (e.g., sequential lines X+2, X+3) based on the index line (e.g., line X). The index accelerator (e.g., line index accelerator 202) is configured to provide the index buffer with the sequential line and the one or more other sequential lines in advance of the sequential line and the one or more other sequential lines being required by a prediction pipeline (e.g., prediction pipeline 554 and/or instruction execution pipeline 250). The index line includes an exit target instruction address of a branch for a given entry instruction address. In one or more embodiments, index line may include a hash that has been formed to account for the exit branch instruction address and the exit branch's target instruction address.

There are many technical benefits and technical solutions by using a processor having a line index accelerator in accordance with one or more embodiments. The line index accelerator keeps the index pipeline ahead of prediction pipeline, which means that the LIB has and uses indices to read out the BTB1 to the LOB before output from the LOB is needed to generate a prediction. For example, the line index accelerator reduces prediction latency from 4 cycles to 2 cycles once primed in one or more embodiments. Also, the line index accelerator causes delays in the index pipeline to have less impact on prediction latency because the index pipeline can read ahead, as a result of the indices provided in advance by the index accelerator to the LIB. As more technical benefits and solutions, the line index accelerator ignores taken intraline branches and all not-taken branches. Any not-taken branches are not relevant when trying to determine which BTB1 indices will need to be searched. As such, this allows the prediction pipeline to exploit the metadata prediction cache (e.g., LOB) without influencing the index pipeline, thereby effectively making the capacity of the latency accelerator larger. One or more embodiments using the line index accelerator allow for set associativity, such that multiple useful exit branches can be saved at the same index. As additional technical benefits and solutions, one or more embodiments limit the number of address bits (e.g., to be stored in the line index accelerator) needed to traverse branch predictions through code, by leveraging performing a BTB1 read to find remaining instruction address bits during payload matching. This allows for use of small line index accelerator and LIB arrays.

Figure 22:
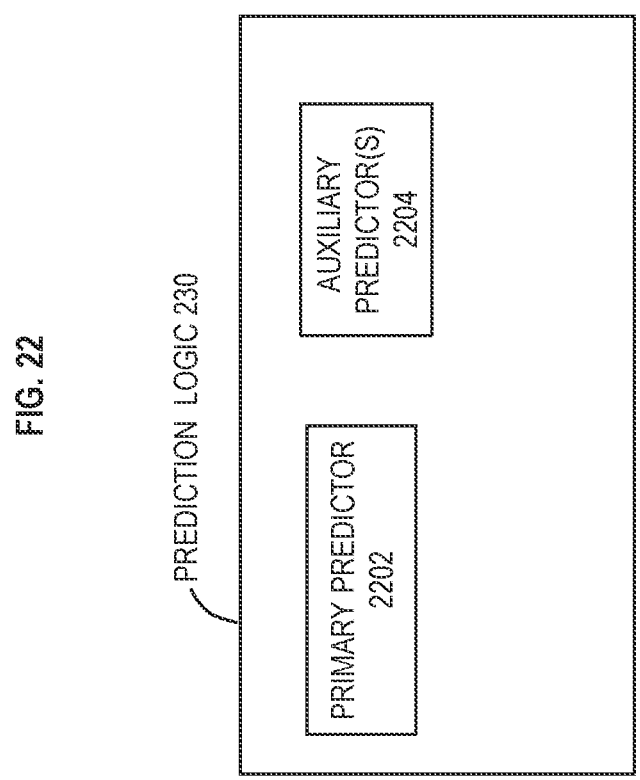
FIG. 22 depicts a block diagram of prediction logic including a primary predictor and auxiliary predictors in accordance with one or more embodiments of the present invention.

In accordance with one or more embodiments, metadata predictor 200 in processor 101 may include a variable length metadata prediction pipeline as discussed further herein. For example, the variable length metadata prediction pipeline may be included in prediction pipeline 554, where the variableness is based on strategically delaying the time for outputting predictions in prediction pipeline 554. In one or more embodiments, prediction logic 230 of prediction pipeline 554 can include a primary predictor 2202 and auxiliary predictors 2204 (e.g., auxiliary predictors 1, 2, 3) as depicted in FIG. 22, along with other digital logic circuitry (not shown) as understood by one of ordinary skill in the art. One or more embodiments are configured to incorporate slower, higher precision auxiliary predictors, as well as external delays, into prediction pipeline 554 by dynamically increasing the length (latency) of the prediction pipeline 554 as needed. Primary predictor 2202 can be a typical metadata predictor which may not have the precision of auxiliary predictors 2204 but provides faster predictions. In one or more embodiments, primary predictor 2202 can include dependency predictors, load/store dependency predictors, branch history table predictors, branch taken or branch not taken predictors, other metadata predictors, and/or combinations of the same. Auxiliary predictors 2204 can include perceptron branch predictors with virtualized weights, auxiliary branch predictors with usefulness tracking, other metadata predictors, and/or combinations of the same.

Most branches can be predicted directly from BTB information, yielding the lowest possible latency branch predictions. Some branches are more complex and need help from higher precision auxiliary predictors. Frequently, these auxiliary predictors take more time to generate a prediction and/or are not physically close to the prediction pipeline (because of the limits on silicon area). It would be wasteful to delay all predictions to accommodate these less frequently used auxiliary predictors. Accordingly, one or more embodiments implement a dynamic, variable length prediction pipeline that allows these slower (auxiliary) predictions by auxiliary predictors 2204 to be incorporated into the prediction pipeline 554 as needed without delaying faster, simple (primary) predictions performed by primary predictor 2202.

Figure 23:
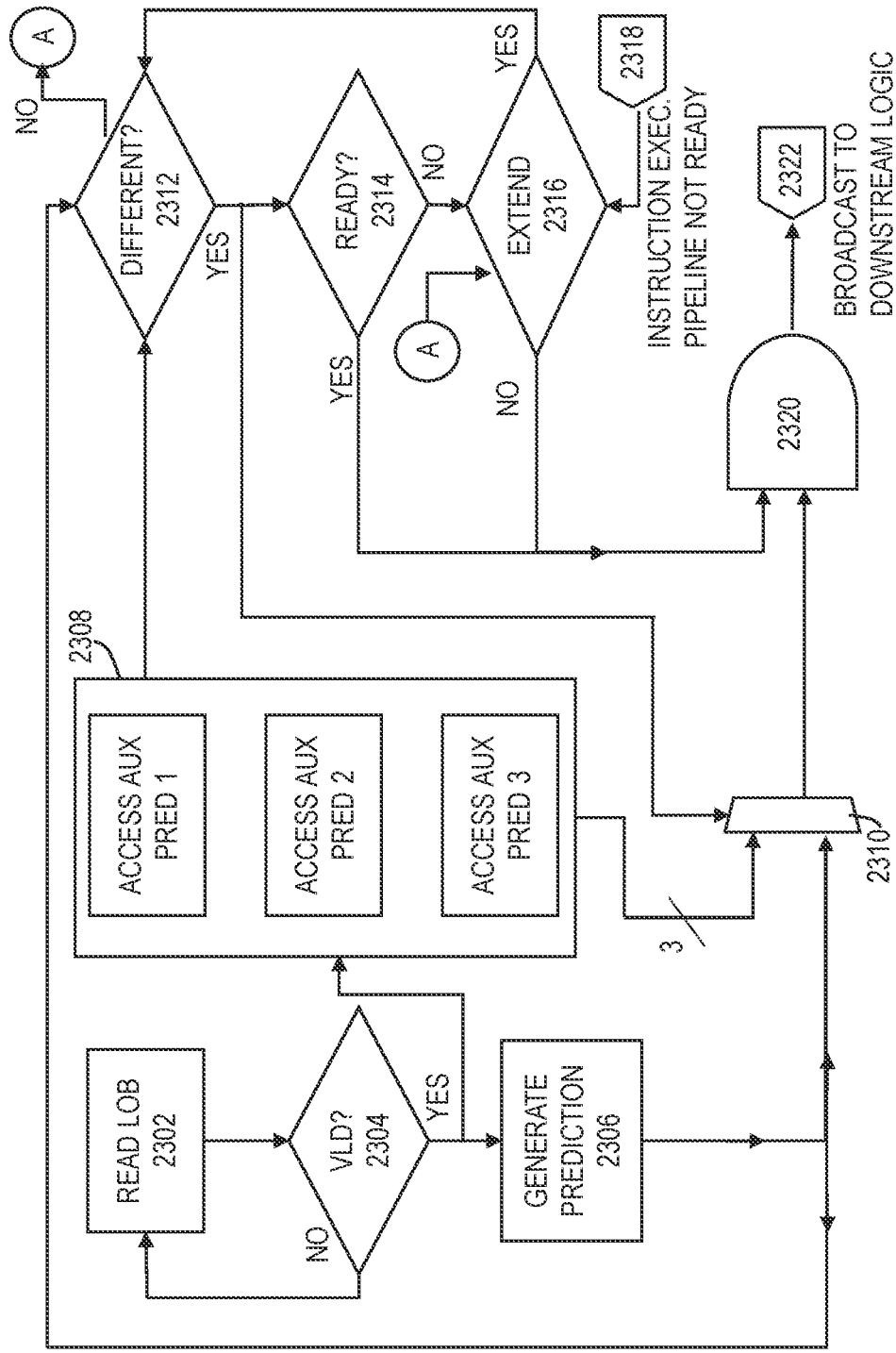
FIG. 23 is flowchart of a variable length metadata prediction pipeline flow for determining when to use auxiliary predictors and/or extend the prediction pipeline in accordance with one or more embodiments of the present invention.

To illustrate further details of variable length metadata prediction pipeline in metadata predictor 200, FIG. 23 is flowchart of the variable length metadata prediction pipeline flow 2300 for determining when to use auxiliary predictors 2204 and/or extend the prediction pipeline (even when primary predictor 2202 is used) according to one or more embodiments. In metadata predictor 200, prediction logic 230 including primary predictor 2202, auxiliary predictors 2204, and logic can be utilized to perform the variable length metadata prediction pipeline flow 2300 discussed herein.

At block 2302 of the variable length metadata prediction pipeline flow 2300, metadata predictor 200 is configured to read out a line of metadata from LOB 208. For example, LIB 204 is configured to query BTB1 206 with an index/index line, and the output of BTB1 206 populates LOB 208. LOB 208 processes metadata on its own as it becomes available. At block 2304, metadata predictor 200 is configured to check if the output line of metadata is valid. For example, check if anything was actually read out from LOB 208. If ("No") no line of metadata was actually read out, flow returns to 2302. If "Yes" the line of metadata is valid, metadata predictor 200 is configured to concurrently generate a prediction using primary predictor 2202 of predictor logic 230 at block 2306 and generate auxiliary predictions using auxiliary predictors 2204 (e.g., auxiliary predictors 1, 2, 3) of predictor logic 230 at block 2308. At block 2310, metadata predictor 200 is configured to multiplex the primary prediction from primary predictor 2202 with the auxiliary prediction from auxiliary predictors 2204 (e.g., auxiliary predictors 1, 2, 3). The auxiliary prediction can be selected when the auxiliary prediction and primary prediction are different.

At block 2312, metadata predictor 200 is configured to check whether the primary prediction from primary predictor 2202 is different from the auxiliary prediction from auxiliary predictors 2204. If ("No") the predictions are the same, the flow proceeds to block 2316. If "Yes" the primary prediction and auxiliary prediction are different (e.g., taken with a direction versus not taken with a direction), metadata predictor 200 is configured to provide a selection for a bit (e.g., 0 or 1) to the multiplexer to indicate that the auxiliary prediction should be passed to "AND" logic at block 2320. Otherwise, the multiplexer passes the primary prediction, for example, in the absence of the selector signal from block 2312. Further, if "Yes" the primary prediction and auxiliary prediction are different, metadata predictor 200 is configured to check if the auxiliary prediction is complete and/or ready at block 2314. Checking if the auxiliary prediction is complete/ready includes confirming that all the information from the auxiliary prediction is available. Although the auxiliary prediction included sufficient information to determine that the auxiliary prediction is different from the primary prediction, the auxiliary prediction may still be waiting on appropriate direction and/or target information to be sent to prediction pipeline 554 and processed. In an example implementation, metadata predictor 200 may be configured to assume that the primary prediction is correct and that the auxiliary predictor 2204 will not be necessary because the selection has already been made multiplexor 2310. Once metadata predictor 200 knows it is different, metadata predictor 200 is configured to wait until some subsequent cycle to generate the correct mux select and allow the prediction to be broadcast (using the new target/direction information from the auxiliary predictor 2204). If "Yes" the auxiliary prediction is ready, the "AND" logic may be informed. If ("No") the auxiliary prediction is not complete/ready, metadata predictor 200 is configured to check whether the length or latency of the prediction pipeline 554 should be extended at block 2316. In some cases, the length or latency of the prediction pipeline 554 could be extended until the auxiliary prediction is ready but returning to block 2312 and/or block 2302. Additionally, if metadata predictor 200 receives a signal and/or indication that the instruction execution pipeline 250 is not ready to receive a new prediction from block 2318, metadata predictor 200 is configured to extend the time (i.e., latency) of prediction pipeline 554 by delaying the broadcast of the new prediction (i.e., auxiliary prediction and/or even the primary prediction) downstream to instruction execution pipeline 250. In one or more embodiments, metadata predictor 200 can reroute flow back to block 2312 in order to extend the pipeline, thereby extending the time (i.e., latency) before the new prediction is broadcast downstream to instruction execution pipeline 250. In one or more embodiments, metadata predictor 200 can reroute flow back to block 2302 (rerouting is now shown) in order to extend the pipeline, thereby extending the time (i.e., latency) before the new prediction is broadcast downstream to instruction execution pipeline 250. In one or more embodiments, metadata predictor 200 can instruct "AND" logic to hold the new prediction for a predetermined number of clock cycles (e.g., using one or more latches and/or other digital logic components) in order to extend the pipeline, thereby extending the time (i.e., latency) before the new prediction is broadcast downstream to instruction execution pipeline 250. In one or more embodiments, metadata predictor 200 can instruct a counter (not shown) to count for a predetermined number of clock cycles in order to extend the pipeline, thereby extending the time (i.e., latency) before the new prediction is broadcast downstream to instruction execution pipeline 250. Metadata predictor 200 is configured to continue checking for the need to extend at block 2316.

Once ("No") the metadata predictor 200 stops receiving a signal and/or indication (e.g., bit) that the instruction execution pipeline 250 is not ready to receive the new prediction from block 2318 and/or once the auxiliary prediction is ready, metadata predictor 200 is configured to cause "AND" logic to pass the new prediction (e.g., auxiliary prediction) downstream via logic to the instruction execution pipeline 250 at blocks 2320, 2322.

Figure 24:
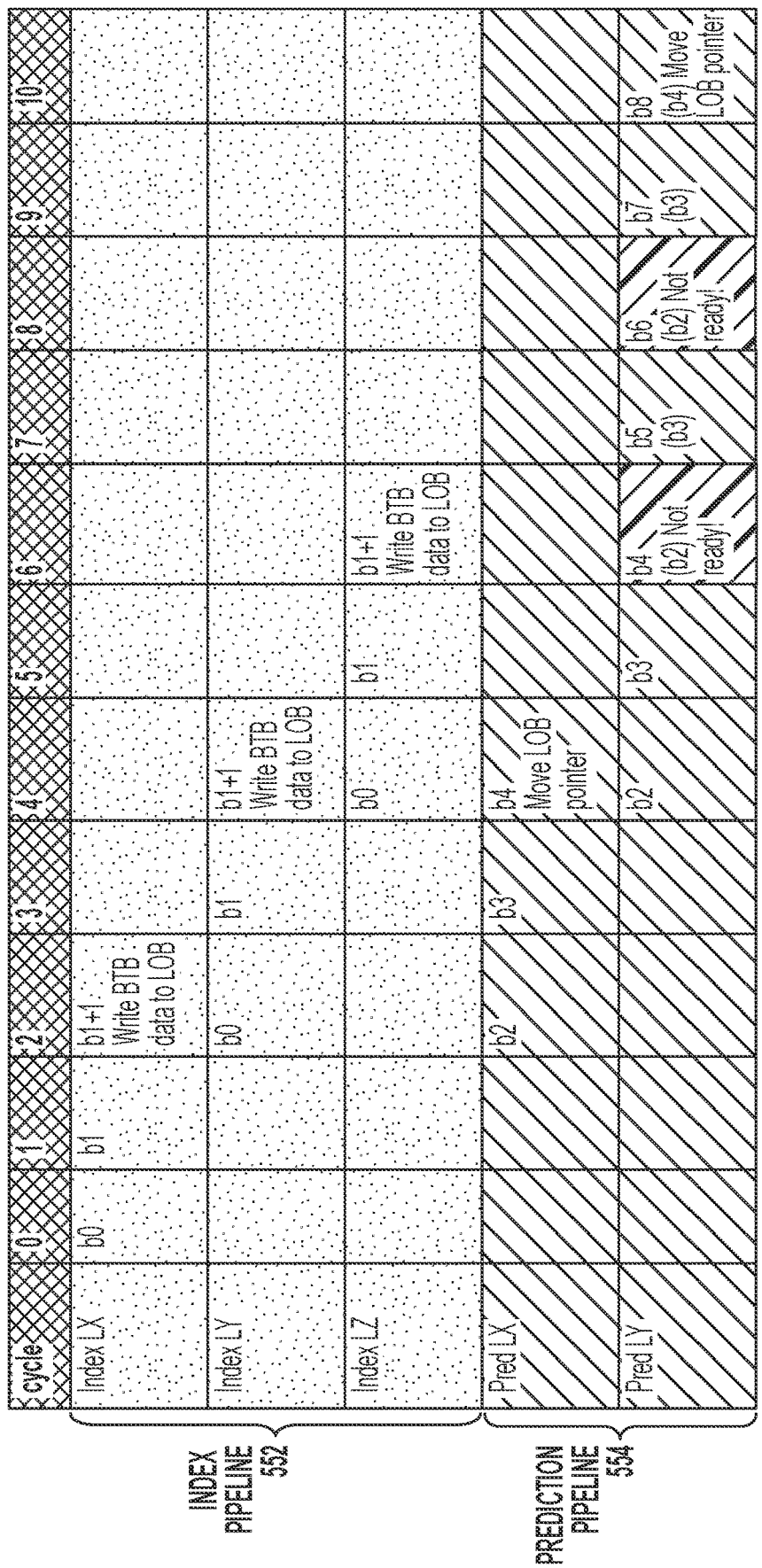
FIG. 24 depicts a block diagram of a pipeline illustration depicting downstream congestion in accordance with one or more embodiments of the present invention.

FIG. 24 is a block diagram of a pipeline illustration depicting downstream congestion in accordance with one or more embodiments. This example illustrates that downstream logic, which could be part of instruction execution pipeline 250 and/or coupled to instruction execution pipeline 250, is not ready for the prediction (e.g., primary prediction and/or auxiliary prediction) from prediction logic 230. Accordingly, prediction logic 230 of metadata predictor 200 is configured to extend prediction pipeline 554 as depicted in block 2316; it is noted that the line of metadata that started the (new) prediction is still present in LOB 208. Once instruction execution pipeline 250 indicates that it is ready, the metadata predictor 200 can move the LOB pointer to repeat output of the same line of metadata that started the (new) prediction such that the new prediction is passed immediately to instruction execution pipeline 250 (i.e., passed without delay and/or extension), thereby providing a variable length (e.g., time) metadata prediction pipeline.

Figure 25:
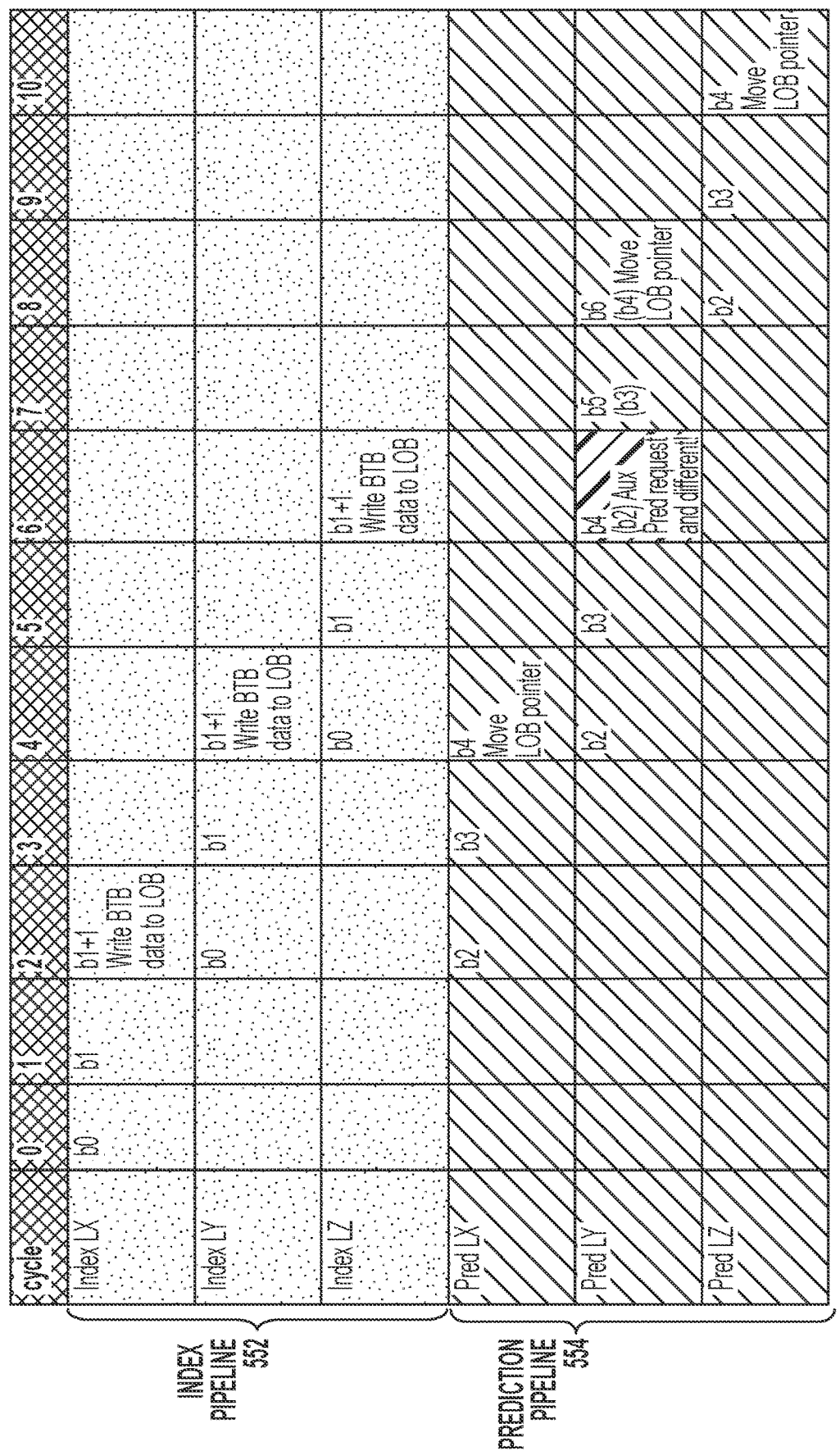
FIG. 25 depicts a block diagram of a pipeline illustration depicting auxiliary predictors having a different prediction than a primary predictor in accordance with one or more embodiments on the present invention.

FIG. 25 is a block diagram of a pipeline illustration depicting that the auxiliary predictors 2204 have a different prediction than primary predictor 2202 in accordance with one or more embodiments. When there is a different auxiliary prediction, on the first attempt at predicting LY, metadata predictor 200 chose the primary prediction, assuming it would be the one to use. However, as metadata predictor 200 is about to broadcast the prediction in cycle 6, it finds that an auxiliary predictor has different information. As a result, metadata predictor 200 cancels the broadcast of the primary prediction and selects (e.g., mux down) the new auxiliary prediction. In one example implementation, this actually goes all the way back to B2 (which is why 'b2' appears in parenthesis under b4) and regenerates the prediction, because metadata predictor 200 is now aware of the auxiliary prediction. Two cycles later, in B6, the new prediction can be reported, and flow can move onto the next LOB entry.

Figure 26:
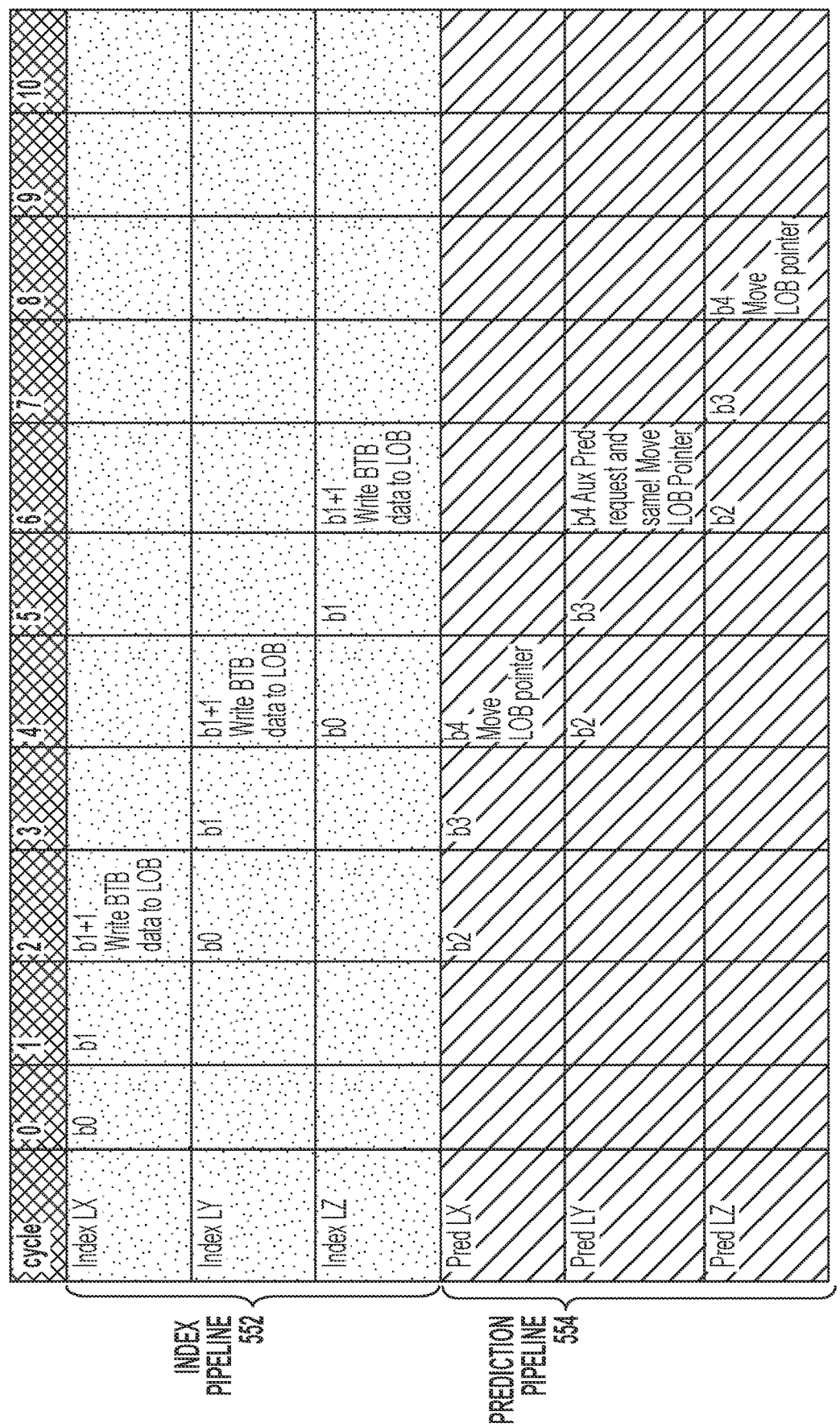
FIG. 26 depicts a block diagram of a pipeline illustration depicting auxiliary predictors having the same prediction as a primary predictor in accordance with one or more embodiments of the present invention.

FIG. 26 is a block diagram of a pipeline illustration depicting that the auxiliary predictors 2204 have the same prediction as primary predictor 2202 in accordance with one or more embodiments. This example illustrates that the prediction pipeline 554 can operate with without an extension and/or delay, thereby providing variableness in the prediction pipeline 554 to address complex branches when they occur and/or simple branches when they occur. Accordingly, prediction pipeline 554 does not loose/delay, for example, two clock cycles when the auxiliary prediction and primary prediction are the same.

Figure 27:
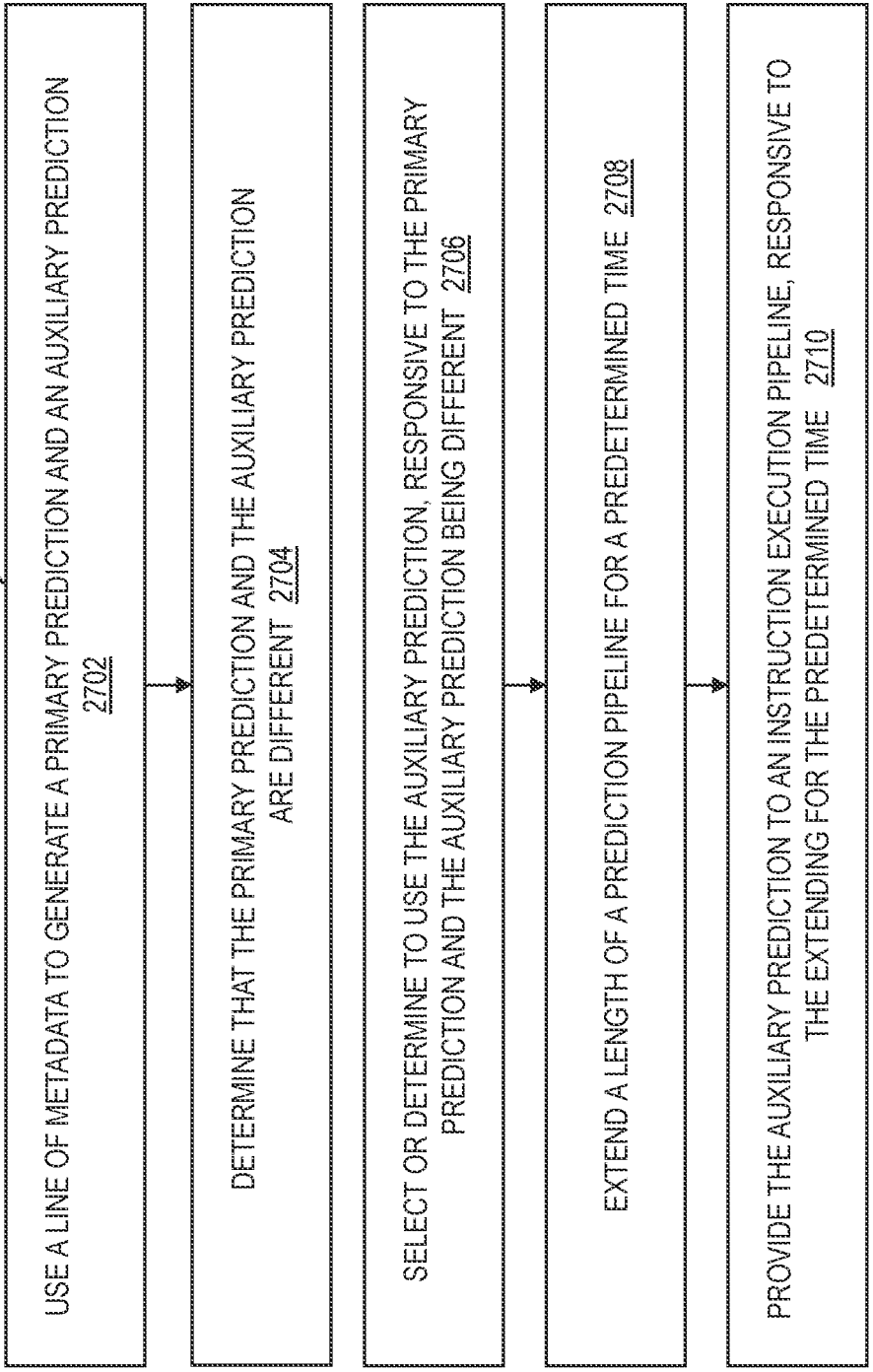
FIG. 27 is a flowchart of a computer-implemented method for using a variable length metadata prediction pipeline in accordance with one or more embodiments of the present invention.

FIG. 27 is a flowchart of a computer-implemented method 2700 for using the variable length metadata prediction pipeline in accordance with one or more embodiments of the invention. Computer-implemented method 2700 may be performed using computer system 100 in FIG. 1. Processors 101 in FIG. 1 along with or any other processor discussed herein can include and/or implement functions of metadata predictor 200 discussed herein. Functions of processor 101 can be used and/or implemented in hardware components of hardware and software layer 60 depicted in FIG. 31.

At block 2702 of computer-implemented method 2700, metadata predictor 200 is configured to use a line of metadata (from LOB 208) to generate a primary prediction (e.g., via primary predictor 2202) and an auxiliary prediction (e.g., via auxiliary predictors 2204). At block 2704, metadata predictor 200 is configured to determine that the primary prediction and the auxiliary prediction are different. At block 2706, metadata predictor 200 is configured to select or determine to use the auxiliary prediction, responsive to the primary prediction and the auxiliary prediction being different. At block 2708, metadata predictor 200 is configured to extend a length of a prediction pipeline 554 for a predetermined time (e.g., a predetermined number of clock cycles). At block 2710, metadata predictor 200 is configured to provide the auxiliary prediction to an instruction execution pipeline 250, responsive to the extending for the predetermined time. The auxiliary prediction requires a longer processing time (e.g., more clock cycles) than the primary prediction.

There are many technical benefits and technical solutions provided by using a processor having a variable length metadata prediction pipeline in accordance with one or more embodiments. Slower, more precise predictions can be incorporated into the prediction pipeline without sacrificing the short latency of basic predictions as discussed herein. Slower predictions are applied before influencing downstream instruction fetching. Technical benefits and solutions allow auxiliary predictors to exist physically distant on the integrated circuit chip from prediction pipeline to save area. The variable length metadata prediction pipeline can account for instances when downstream logic cannot accept more prediction information. The variable length metadata prediction pipeline can be used in conjunction with the metadata predictor cache (e.g., LOB) and intraline branch reuse. Further, the variable length metadata prediction pipeline can be incorporated into a parent-based system.

Figure 28:
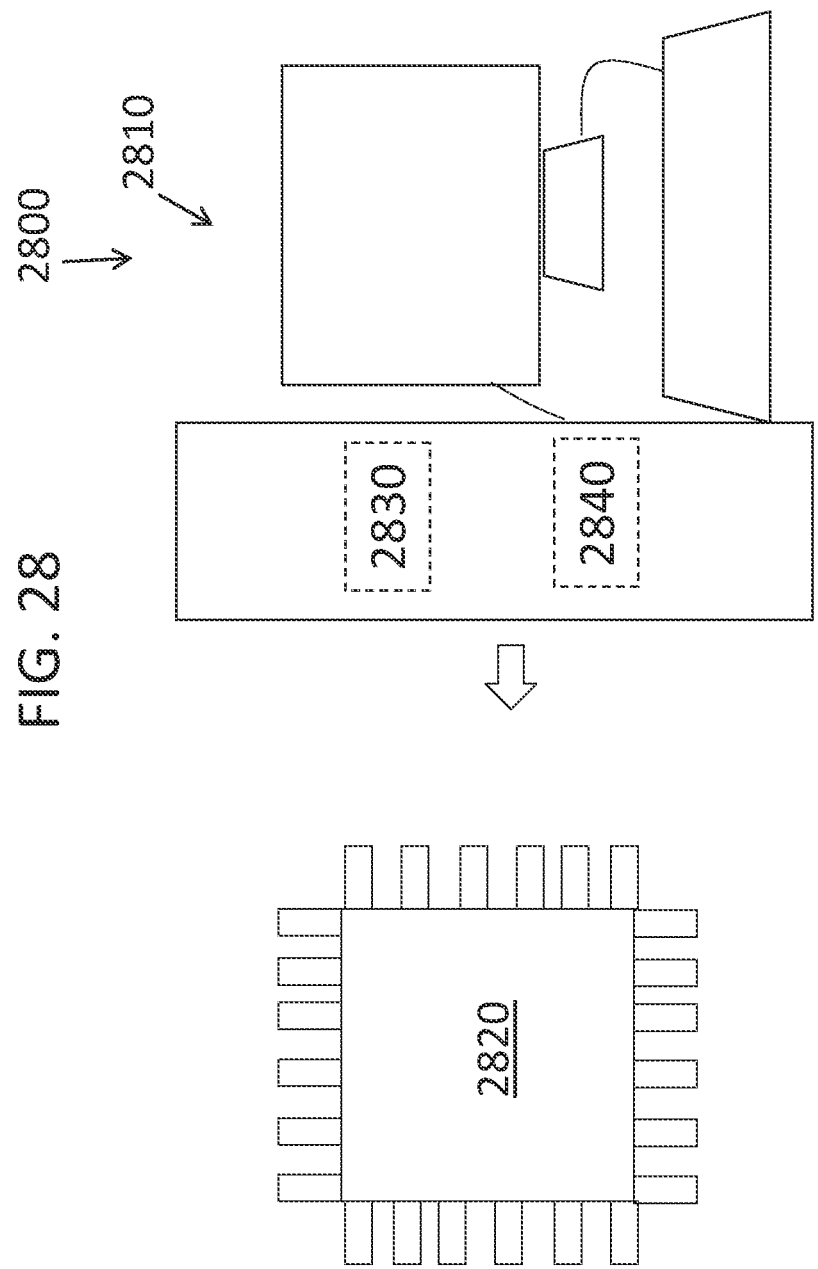
FIG. 28 is a block diagram of a system to design/layout a metadata predictor in accordance with one or more embodiments of the present invention.

FIG. 28 is a block diagram of a system 2800 for metadata predictor 200 according to embodiments of the invention. The system 2800 includes processing circuitry 2810 used to generate the design 2830 (which includes metadata predictor 200) that is ultimately fabricated into an integrated circuit 2820. The steps involved in the fabrication of the integrated circuit 2820 are well-known and briefly described herein. Once the physical layout 2840 is finalized, based, in part, on the metadata predictor 200 according to embodiments of the invention to facilitate optimization of the routing plan, the finalized physical layout 2840 is provided to a foundry. Masks are generated for each layer of the integrated circuit based on the finalized physical layout. Then, the wafer is processed in the sequence of the mask order. The processing includes photolithography and etch. This is further discussed with reference to FIG. 29.

Figure 29:
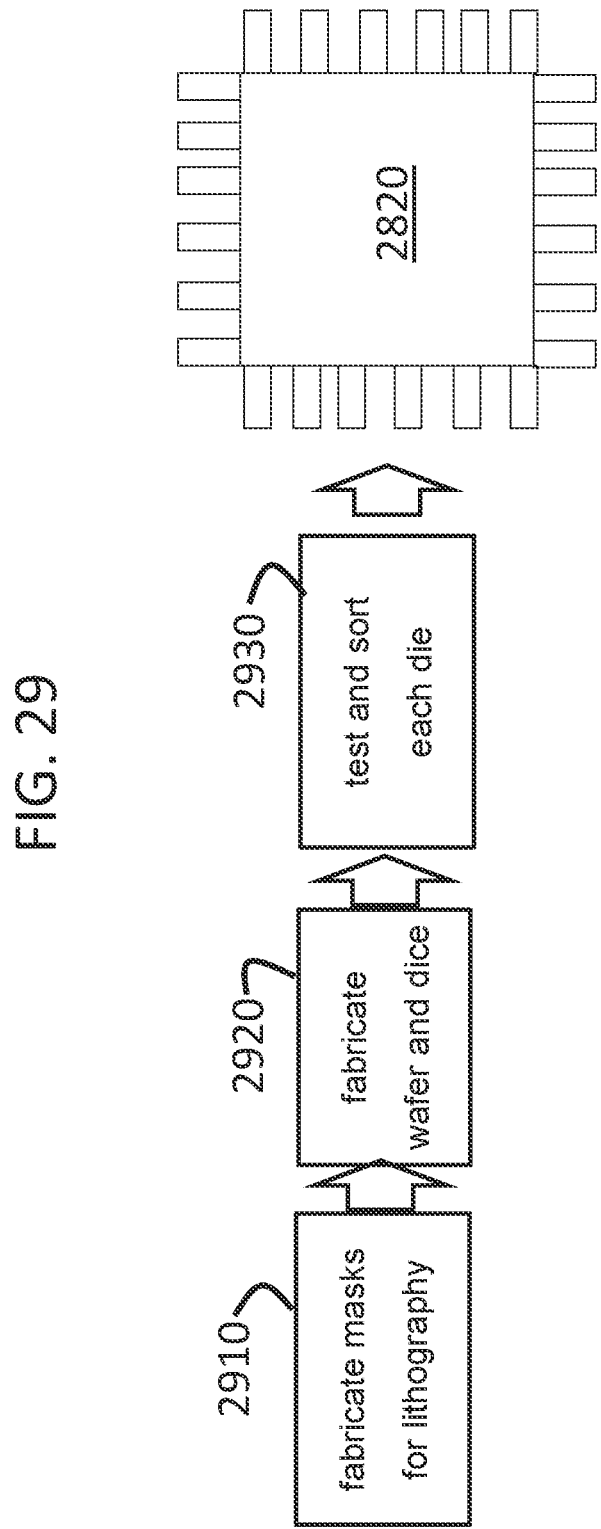
FIG. 29 is a process flow of a method of fabricating the integrated circuit of FIG. 28 in accordance with one or more embodiments of the present invention.

FIG. 29 is a process flow of a method of fabricating the integrated circuit according to exemplary embodiments of the invention. Once the physical design data is obtained, based, in part, on the metadata predictor 200, the integrated circuit 120 can be fabricated according to known processes that are generally described with reference to FIG. 29. Generally, a wafer with multiple copies of the final design is fabricated and cut (i.e., diced) such that each die is one copy of the integrated circuit 2820. At block 2910, the processes include fabricating masks for lithography based on the finalized physical layout. At block 2920, fabricating the wafer includes using the masks to perform photolithography and etching. Once the wafer is diced, testing and sorting each die is performed, at block 2930, to filter out any faulty die.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 30:
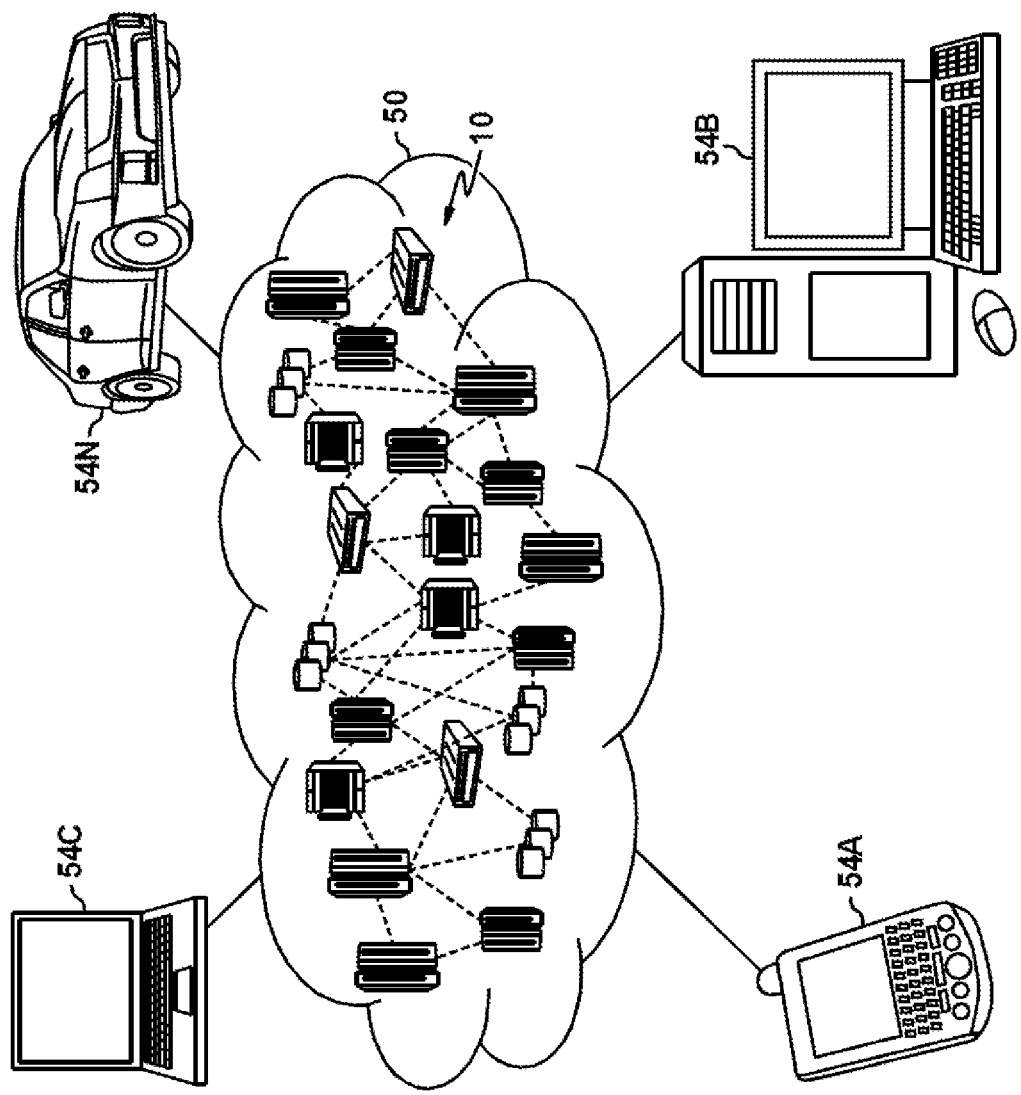
FIG. 30 depicts a cloud computing environment according to one or more embodiments of the present invention.

Referring now to FIG. 30, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 30 are intended to be illustrative only and that computing nodes 10 and cloud computing environment 50 can communicate with any type of computerized device over any type of network and/or network addressable connection (e.g., using a web browser).

Figure 31:
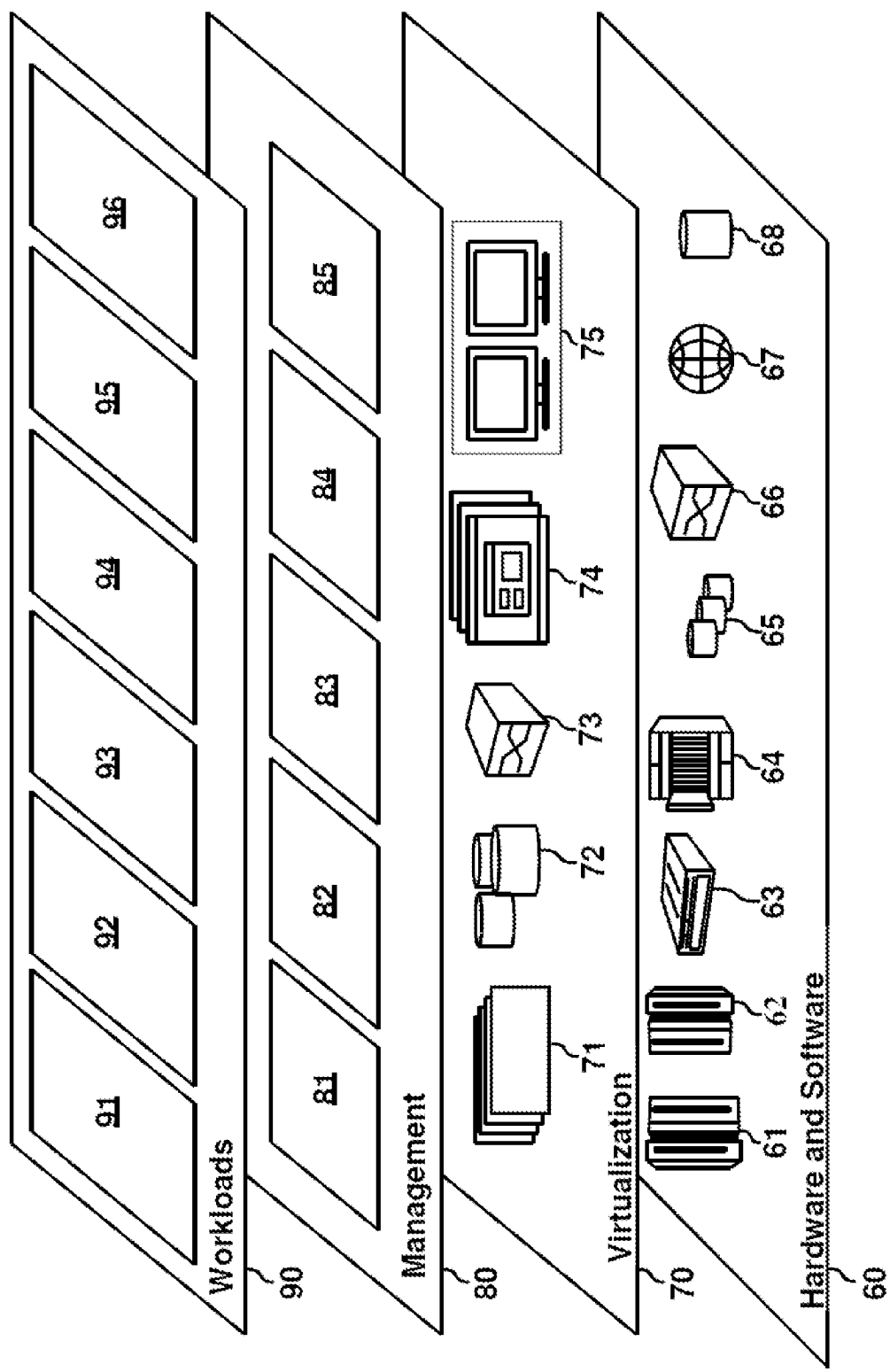
FIG. 31 depicts abstraction model layers according to one or more embodiments of the present invention.

Referring now to FIG. 31, a set of functional abstraction layers provided by cloud computing environment 50 (FIG. 30) is shown. It should be understood in advance that the components, layers, and functions shown in FIG. 31 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   operating an index pipeline to generate indices in an index buffer in which the indices are used for reading out a memory device, the indices to the index buffer being generated using an accelerator, wherein writing to the accelerator is based, at least in part, on whether a target address for a branch taken is intraline;
   populating a prediction cache with metadata of instructions, the metadata of instructions being read from the memory device; and
   operating a prediction pipeline to generate a prediction using the metadata of the instructions from the prediction cache, the populating of the prediction cache with the metadata of the instructions being performed asynchronously to the operating of the prediction pipeline.

2. The computer-implemented method of claim 1, wherein the populating of the prediction cache with the metadata of the instructions being performed asynchronously to the operating of the prediction pipeline comprises continually indexing the memory device to read out the metadata for the prediction cache independent of processes in the prediction pipeline.

3. The computer-implemented method of claim 1, wherein the index buffer is configured to read out the memory device having the metadata for the prediction cache without reliance on and in advance of generating the prediction using the metadata from the prediction cache.

4. The computer-implemented method of claim 1, wherein the prediction pipeline is configured to output a line of the metadata of the instructions from the prediction cache.

5. The computer-implemented method of claim 1, wherein the prediction pipeline is configured to continuously reuse a line of the metadata of the instructions from the prediction cache without having to re-access the memory device.

6. The computer-implemented method of claim 1, wherein the prediction pipeline is configured to continuously reuse a line of the metadata of the instructions that has been output from the prediction cache in order to generate a new prediction, responsive to a previous prediction being predicted to the line of the metadata.

7. The computer-implemented method of claim 1, wherein the prediction is provided to an out-of-order instruction execution pipeline, the out-of-order instruction execution pipeline operating in parallel to the index pipeline and the prediction pipeline.

8. A system comprising:
   a memory having computer readable instructions; and
   one or more processors for executing the computer readable instructions, the computer readable instructions controlling the one or more processors to perform processes comprising:
      operating an index pipeline to generate indices in an index buffer in which the indices are used for reading out a memory device, the indices to the index buffer being generated using an accelerator, wherein writing to the accelerator is based, at least in part, on whether a target address for a branch taken is intraline;
      populating a prediction cache with metadata of instructions from the memory device; and
      operating a prediction pipeline to generate a prediction using the metadata of the instructions from the prediction cache, the populating of the prediction cache with the metadata of the instructions being performed asynchronously to the operating of the prediction pipeline.

9. The system of claim 8, wherein the populating of the prediction cache with the metadata of the instructions being performed asynchronously to the operating of the prediction pipeline comprises continually indexing the memory device to read out the metadata for the prediction cache independent of processes in the prediction pipeline.

10. The system of claim 8, wherein the index buffer is configured to read out the memory device having the metadata for the prediction cache without reliance on and in advance of generating the prediction using the metadata from the prediction cache.

11. The system of claim 8, wherein the prediction pipeline is configured to output a line of the metadata of the instructions from the prediction cache.

12. The system of claim 8, wherein the prediction pipeline is configured to continuously reuse a line of the metadata of the instructions from the prediction cache without having to re-access the memory device.

13. The system of claim 8, wherein the prediction pipeline is configured to continuously reuse a line of the metadata of the instructions that has been output from the prediction cache in order to generate a new prediction, responsive to a previous prediction being predicted to the line of the metadata.

14. The system of claim 8, wherein the prediction is provided to an out-of-order instruction execution pipeline, the out-of-order instruction execution pipeline operating in parallel to the index pipeline and the prediction pipeline.

15. A computer program product comprising a computer readable storage medium having program instructions embodied therewith, the program instructions executable by one or more processors to cause the one or more processors to perform processes comprising:

operating an index pipeline to generate indices in an index buffer in which the indices are used for reading out a memory device, the indices to the index buffer being generated using an accelerator, wherein writing to the accelerator is based, at least in part, on whether a target address for a branch taken is intraline;

populating a prediction cache with metadata of instructions from the memory device; and operating a prediction pipeline to generate a prediction using the metadata of the instructions from the prediction cache, the populating of the prediction cache with the metadata of the instructions being performed asynchronously to the operating of the prediction pipeline.

16. The computer program product of claim 15, wherein the populating of the prediction cache with the metadata of the instructions being performed asynchronously to the operating of the prediction pipeline comprises continually indexing the memory device to read out the metadata for the prediction cache independent of processes in the prediction pipeline.

17. The computer program product of claim 15, wherein the index buffer is configured to read out the memory device having the metadata for the prediction cache without reliance on and in advance of generating the prediction using the metadata from the prediction cache.

18. The computer program product of claim 15, wherein the prediction pipeline is configured to output a line of the metadata of the instructions from the prediction cache.

19. The computer program product of claim 15, wherein the prediction pipeline is configured to continuously reuse a line of the metadata of the instructions from the prediction cache without having to re-access the memory device.

20. The computer program product of claim 15, wherein the prediction pipeline is configured to continuously reuse a line of the metadata of the instructions that has been output from the prediction cache in order to generate a new prediction, responsive to a previous prediction being predicted to the line of the metadata.

* * * * *